United States Patent [19]

Schneider

[11] Patent Number: 5,274,760

[45] Date of Patent: Dec. 28, 1993

[54] EXTENDABLE MULTIPLE IMAGE-BUFFER FOR GRAPHICS SYSTEMS

[75] Inventor: Bengt-Olaf Schneider, Ossining, N.Y.

[73] Assignee: International Business Machines Corporation, Armonk, N.Y.

[21] Appl. No.: 813,318

[22] Filed: Dec. 24, 1991

[51] Int. Cl.$^5$ .............................................. G06F 15/20
[52] U.S. Cl. ................................ 395/162; 395/166; 345/193
[58] Field of Search .......................... 395/162–166, 395/250; 340/747, 750, 798–800

[56] References Cited

U.S. PATENT DOCUMENTS

| | | | |
|---|---|---|---|
| 3,106,698 | 10/1963 | Unger | 364/200 |
| 4,484,349 | 11/1984 | McCubbrey | 382/41 |
| 4,491,932 | 1/1985 | Ruhman et al. | 364/DIG. 2 |
| 4,590,465 | 5/1986 | Fuchs | 340/723 |
| 4,648,045 | 3/1987 | Demetrescu | 395/163 |
| 4,658,247 | 4/1987 | Gharachorloo | 395/162 |
| 4,700,320 | 10/1987 | Kapur | 395/158 |
| 4,737,921 | 4/1988 | Goldwasser et al. | 395/163 |
| 4,809,347 | 2/1989 | Nash et al. | 382/49 |
| 4,827,445 | 5/1989 | Fuchs | 395/164 |
| 4,860,248 | 8/1989 | Lumelsky | 395/163 |
| 4,949,280 | 8/1990 | Littlefield | 395/163 |
| 4,958,303 | 9/1990 | Assarpour et al. | 395/163 |
| 4,967,392 | 10/1990 | Werner et al. | 364/DIG. 2 |
| 5,010,515 | 4/1991 | Torborg, Jr. | 395/163 |
| 5,027,292 | 6/1991 | Rossignac et al. | 395/164 |
| 5,046,023 | 9/1991 | Katura et al. | 395/163 |

OTHER PUBLICATIONS

"Morphic Processing of Large Images Without an Image Buffer", IBM Technical Disclosure Bulletin, vol. 29, No. 8, Jan. 1987 by R. Jaffe et al.
"Computer Graphics Using Multi-Echelon Processing Structures", IBM Technical Discl. Bulletin, vol. 23, No. 9, Feb. 1981 by S. Boinodiris.
"Neighborhood Parallel Access Bit Map Memory", IBM Technical Discl. Bulletin, vol. 34, No. 2, Jul. 1991, D. C. Forslund.
"The Silicon Graphics 4D/240GTX Superworkstation" by K. Akeley, IEEE Computer Graphics & Applications, Jul. 1989.
"Graphics Processing on a Graphics Supercomputer", B. Borden, IEEE Computer Graphics & Applications, Jul. 1989.

Primary Examiner—Dale M. Shaw
Assistant Examiner—Kee M. Tung
Attorney, Agent, or Firm—Perman & Green

[57] ABSTRACT

A graphics buffer (22) for storing information describing pixels that represent an image. The graphics buffer includes Surface Buffer Modules (32) that include a first memory (46) for storing pixel surface information, such as color, for a plurality of pixels. The Surface Buffer Modules, each further include a first processor (44) coupled to the first memory for modifying pixel information read therefrom and for storing said modified pixel information back into the first memory. The graphics buffer may also include at least one Control Buffer Module (34) that includes a second memory (46') for storing other pixel information, such as pixel flags, and a second processor (44') for modifying the other pixel information. A pixel bus (38) is coupled in common between the Surface Buffer Module and the at least one Control Buffer Module for conveying pixel-related information, including pixel data, pixel addresses, and the results of pixel tests, therebetween. Virtual Buffer Modules (36) are also coupled to the pixel bus for importing pixel data and addresses thereto and for exporting pixel data and addresses therefrom.

44 Claims, 17 Drawing Sheets

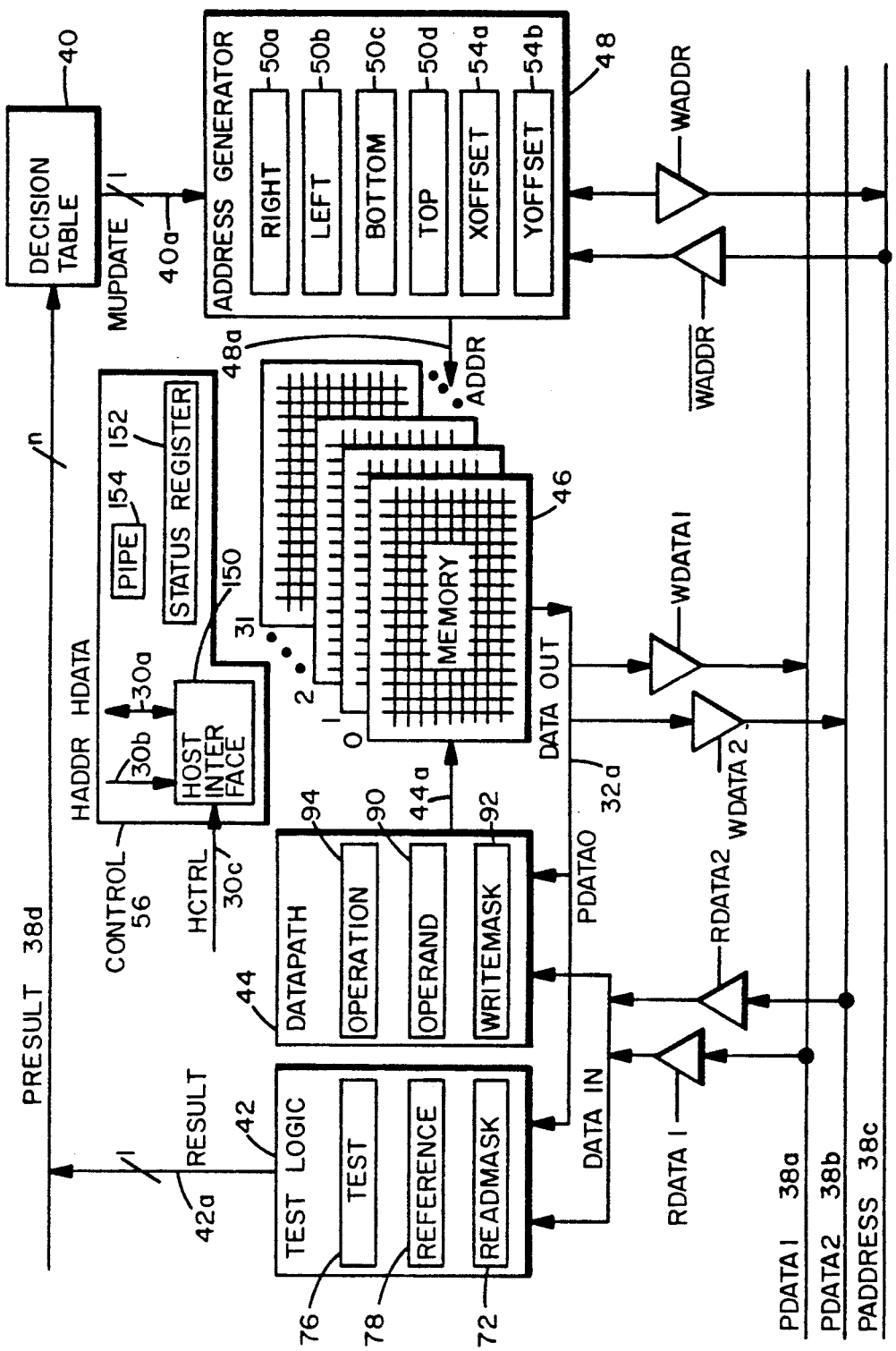

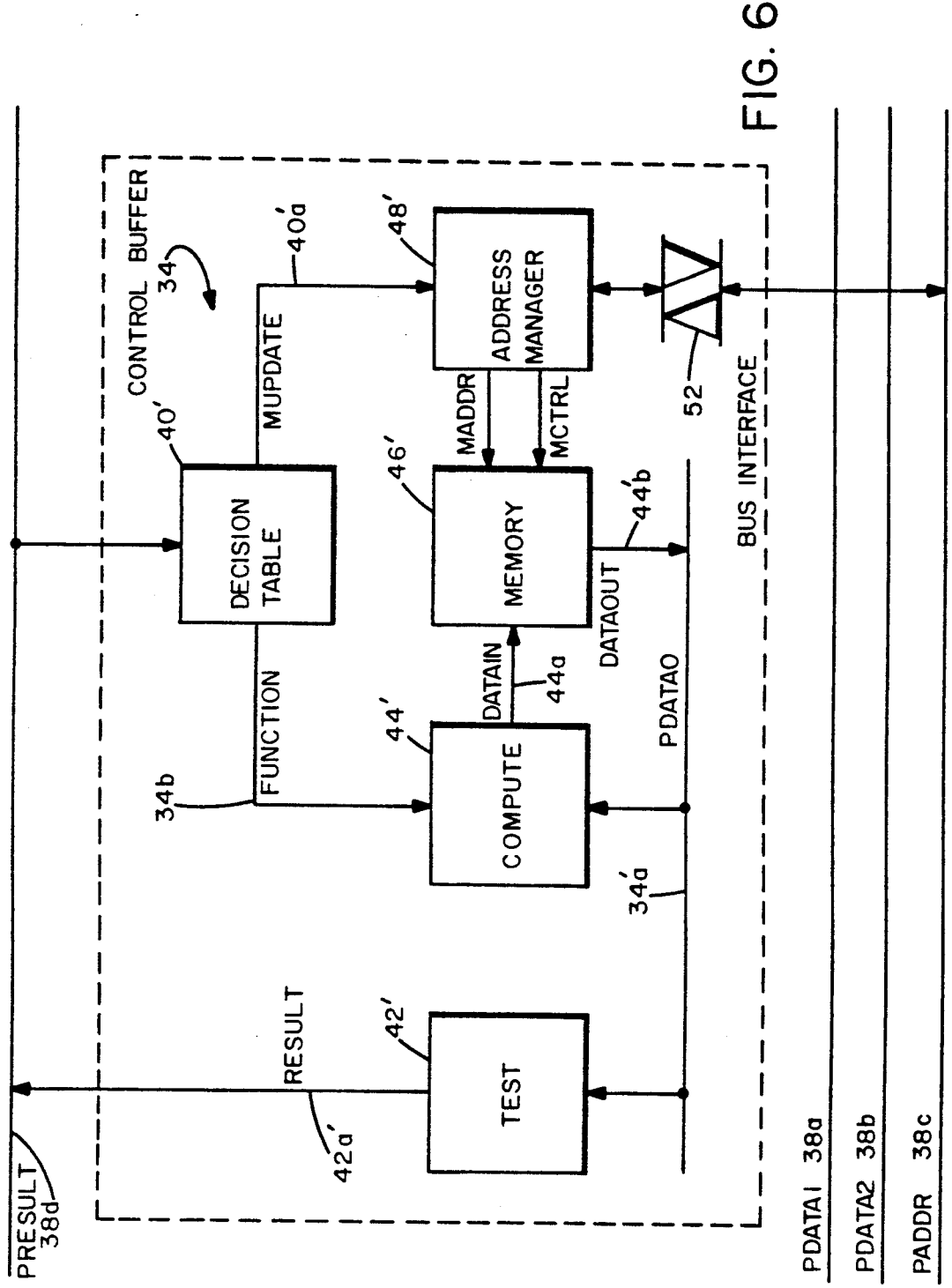

(a)

(b)

EXTENDABLE MULTIPLE IMAGE-BUFFER FOR GRAPHICS SYSTEMS

FIELD OF THE INVENTION

This invention relates generally to graphical display apparatus and method and, in particular, to an image buffer for a high performance graphics system.

BACKGROUND OF THE INVENTION

High performance graphics systems employ buffer memory to store surface data. The contents of these buffers describe certain features of an object's surface, such as color, or a distance along a z-axis (depth) from the viewer. The data is stored, for each pixel, in order to support pixel-oriented algorithms that solve problems, such as hidden surface removal or anti-aliasing. These algorithms are supported by hardware facilities that perform relatively simple operations, such as comparing a value stored in a memory location against another value.

Traditionally, the organization of these buffers is rather restrictive and permits only certain, predefined usages. This restriction is primarily a consequence of hardware capabilities. These restrictions prevent equipping the buffers with more processing power and providing readily accessible data paths with higher bandwidths. By example, it is usually not possible to simultaneously compare two values against two different buffer locations. Such limitations of traditional buffer architectures makes them generally unusable for advanced graphics algorithms that require more powerful and complex operations and tests on the buffers.

More particularly, it is well recognized that computer graphics is an indispensable tool in many scientific, technical, and medical disciplines. The efficiency of users, such as an engineer using a CAD program, is improved significantly if the graphical display responds interactively to user input and commands. However, there are only a limited number of algorithms that are simple enough to provide interactive performance when executed using the main CPU of a graphics workstation. Thus, most algorithms and applications require hardware support to achieve the necessary throughput and response time for maintaining the required real-time performance.

To this end, computer graphics workstations provide a variety of hardware features that support certain algorithms and applications. Among these features are special processing stages tailored to fast execution of typical geometric calculations, such as 4×4 matrix operations. Many algorithms are also supported by installing large buffer memories dedicated to storing certain data types, and by providing special operations for these buffers.

These operations implement the core functions of the supported algorithms. The following are examples of functions which have been supported by dedicated graphics buffers: hidden surface removal; anti-aliasing; windowing; and texture mapping.

Memory, or graphics buffers, that provide storage for each pixel on a graphics display form a part of every raster graphics system. Traditionally, such buffers stored information to be displayed on the graphics screen, and therefore were known as frame buffers or display memory.

More advanced workstations are equipped with additional pixel memory, as described by, for example, Kurt Akeley in "The Silicon Graphics 4D/240GTX Superworkstation", IEEE Computer Graphics & Applications, vol. 9, no. 4, pp. 71-83, July 1989, and by Bruce S. Borden, "Graphics Processing on a Graphics Supercomputer", Computer Graphics & Applications, vol. 4, no. 9, pp. 56-62, July 1989. This additional pixel memory supports certain predefined functions. The following describes some of the more popular functions and the manner in which they are supported by pixel buffers.

Hidden surface removal

The pixel buffer supports a z-buffer (depth buffer) algorithm attributed to Edwin Catmull, "A Subdivision Algorithm for Computer Display of Curved Surfaces", PhD thesis, Computer Science Department, University of Utah, Salt Lake City, Utah, 1974 (published as Report UTEC-CSc-74-133). For each pixel, depth values are stored that give the depth of the surface closest to the viewer. The depth value and the color value at a pixel are replaced only if a new depth value is less than a stored depth value, indicating that the associated pixel lies in front of a previous pixel.

Anti-aliasing/Transparency

In addition to Red-Green-Blue (RGB) color values, a coverage or transparency coefficient (alpha) is stored in pixel memory. If a new color is written into pixel memory, it is combined with a previous color based on the values of the stored alpha and the new alpha. This method is known as alpha-blending or compositing, as described by Tom Duff, "Compositing 3-D Rendered Images", ACM Computer Graphics (Proc. Siggraph), vol. 19, no. 3, pp. 41-44, July 1985.

Texture mapping

Point sampled images or patterns, called textures, are stored in additional pixel memory. The values in memory are used to modify certain parameters of the objects to be displayed; in the simplest case, the color.

Another method to take advantage of extended pixel memory is to provide extra control bit planes; that is, to provide individual bits for each pixel that may be accessed and manipulated separately or in combinations. These bits typically store information that controls writing into another pixel buffer memory. Applications for control bit planes include the construction of screen masks, the storage of pixel flags, and implementing pixel counters.

In general, a graphics buffer architecture includes two components. These components are the graphics memory and the associated data paths that perform operations on that memory. By example, the z-buffer algorithm requires that the depth values stored in the depth memory be compared against an incoming depth value. However, known types of graphics buffer architectures provide only the functionality required to perform the algorithms that the buffers were intended to support. In other words, the graphics buffer architecture predefines the usage of the graphics buffer. However, as new algorithms and techniques emerge, these conventional graphics buffer architectures lack the flexibility to adapt to the new requirements. They are generally unable to support new graphics methods, and therefore prohibit the hardware-supported implementation of such methods.

It is thus one object of the invention to provide a novel organization of graphics buffers and associated data paths that overcome the limitations of conventional systems.

It is another object of the invention to provide a modular graphics buffer architecture within a framework that supports operations on the buffers.

It is a further object of the invention to provide a graphics buffer architecture that has one processor per buffer in combination with a general and regular arrangement of buffer modules and data paths.

A still further object of the invention is to provide a modular and programmable graphics buffer architecture having one processor per buffer, a bus that couples the modular buffers together, and a capability to programmably configure the graphics buffers for a given graphics application.

SUMMARY OF THE INVENTION

The foregoing and other problems are overcome and the objects of the invention are realized by a graphics buffer architecture for a raster graphics system. The architecture is defined by and constructed from modules that are all connected to a common Pixel Bus. Modules are programmed by a host processor, and communicate with the host processor via a host bus. Each module contains memory and a local processor that has access to the Pixel Bus and the local memory. The Pixel Bus includes data paths, an address path, and a control path that includes a plurality of lines that express the result of tests on pixel data.

There are a plurality of types of buffer modules, including surface buffers, control buffers, and virtual buffers. Surface buffers store surface information within internal pixel memory, and write and read surface information to and from a Pixel Data Bus. Control buffers store control information for each pixel, such as pixel flags, and also interact with the Pixel Bus, particularly a Pixel Address Bus. Virtual Buffers provide a common interface between the Pixel Bus and external agencies that source or sink pixel data and/or pixel addresses.

Each buffer module performs tests and operations using data on the Pixel Bus and data from the associated internal memory. Each buffer module updates the internal memory under a condition that takes into account the result of tests of (possibly all) other modules. Likewise, an operation to compute a new pixel value may be influenced by tests performed by other buffer modules.

All buffer modules operate in parallel and execute programmable functions and tests. The modules are programmed by specifying state variables that determine the behavior of the buffer module. Once programmed, the modules may operate independently from the host processor.

The Pixel Bus includes several sub-buses. The sub-buses can be controlled by one buffer module or by different buffer modules. The selection of buffer modules that are driving the sub-buses, and the modules that are reading the sub-buses, is configurable from the host processor.

Data is entered into and exported from the buffer modules by means of the virtual buffers that exhibit the same interface to the Pixel Bus as do the control buffers and the surface buffers.

More specifically, disclosed is a graphics buffer for storing information describing pixels that represent an image. The graphics buffer includes a plurality of buffer modules. A minimum configuration may be viewed as a configuration that provides functionality equivalent to a traditional graphics buffer system. For example, three Surface Buffer Modules may be employed. One Surface Buffer Module stores, for each pixel, a depth (z-buffer). The remaining two Surface Buffer Modules store, for each pixel, color information (frame buffers). The two color buffers form a double buffer configuration, wherein as pixel data is output from one buffer to a display, the other buffer receives and stores pixel color data from a rasterizer.

Also by example, a graphics buffer includes a plurality of Surface Buffer Modules, each including a first memory for storing pixel information for a plurality of pixels. Each of the Surface Buffer Modules further includes a first processor coupled to the first memory for modifying pixel information read therefrom and for storing modified pixel information back into the first memory. The graphics buffer further includes at least one Control Buffer Module having a second memory for storing, for each pixel, other pixel information and a second processor for modifying the other pixel information. A pixel bus is coupled between the plurality of Surface Buffer Modules and the at least one Control Buffer Module for conveying pixel-related information, including pixel data and pixel addresses, therebetween. Virtual Buffer Modules are also coupled to the pixel bus for importing pixel data and addresses thereto and for exporting pixel data and addresses therefrom.

BRIEF DESCRIPTION OF THE DRAWING

The above set forth and other features of the invention are made more apparent in the ensuing Detailed Description of the Invention when read in conjunction with the attached Drawing, wherein:

FIG. 5b is a block diagram showing in greater detail the Surface Buffer of FIG. 5a;

FIG. 6 is a block diagram of a Control Buffer that is also a component of the M-Buffer;

FIGS. 8a and 8b show one organization for the pixel memory, wherein

FIG. 8a illustrates an arrangement of pixels on a display screen; and FIG. 8b illustrates a corresponding location of the pixels within the pixel memory;

DETAILED DESCRIPTION OF THE INVENTION

Figure 1:
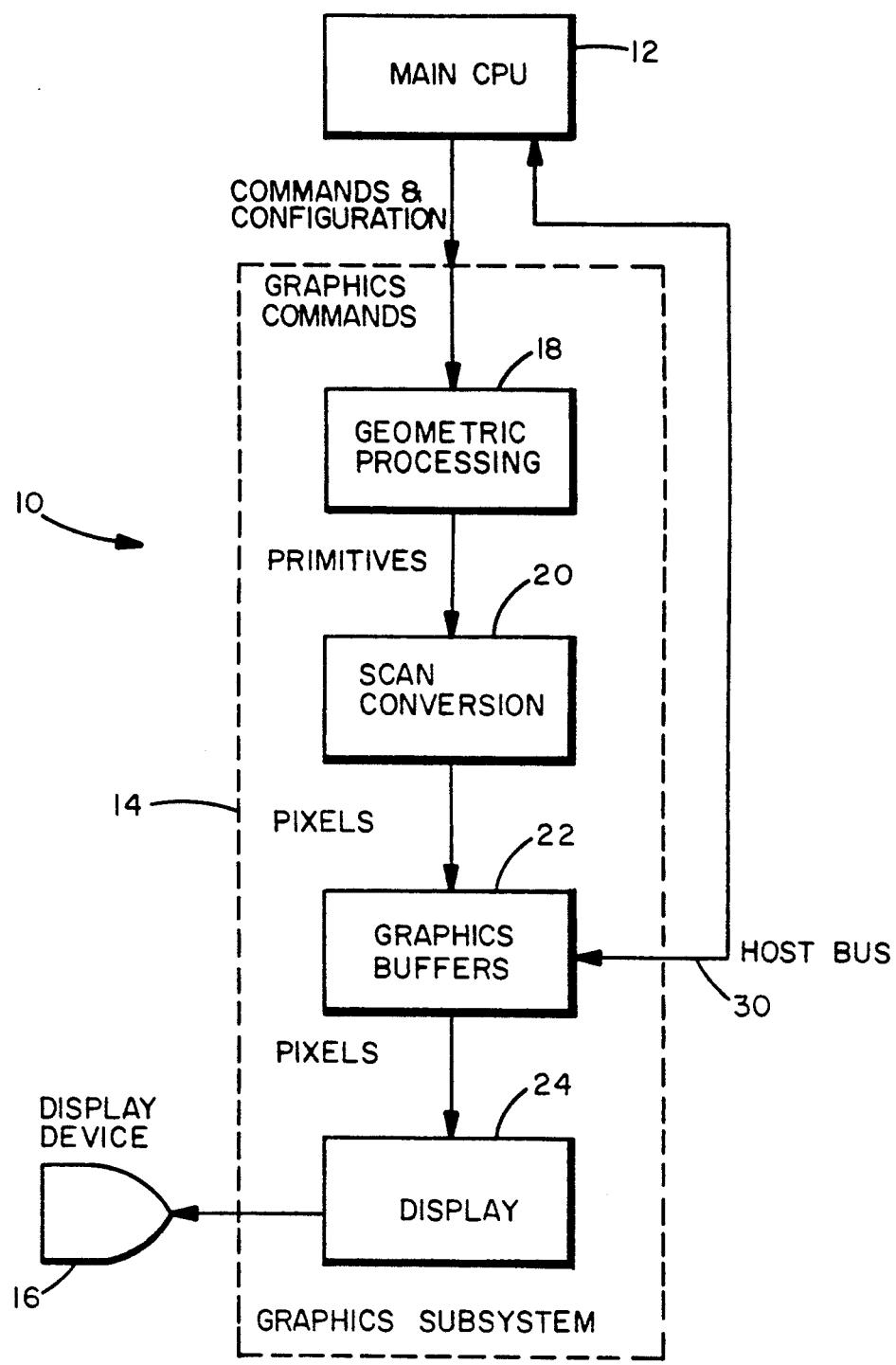
FIG. 1 is a block diagram depicting an overall architecture of a graphics system, the graphics system including a plurality of image buffers.

A typical raster graphics system 10, as illustrated in FIG. 1, includes a main (Host) processor 12 and a graphics subsystem 14. The Host processor 12 executes an application program and dispatches graphics tasks to the graphics subsystem 14.

The graphic subsystem 14 includes several components that perform operations necessary to prepare geometric entities for display on a raster display device 16. For the purposes of describing the invention, a model of the graphics subsystem 14 is employed that contains the following functional units. It should be realized that this particular model is not to be construed in a limiting sense upon the practice of the invention.

A Geometric Processing unit 18 performs geometric and perspective transformations, as well as clipping against screen (window) boundaries. The resulting graphics primitives, e.g. vertices, lines, triangles, etc., are described in screen space coordinates.

A Scan Conversion (Rasterization) unit 20 breaks down the graphics primitives into raster information, i.e. a description of display screen pixels that are covered by the graphics primitives.

A Graphics Buffer unit 22 receives the pixels and stores, tests, and manipulates the pixels on a pixel-by-pixel basis.

A Display unit 24 receives pixels from the Graphics Buffer unit 22 and transforms them into information displayed on the output device 16, typically a raster screen.

The invention specifically concerns, and provides a novel architecture for, the Graphics Buffer unit 22.

As employed herein, the following terms are considered to have the following meanings.

Buffer: A module that contains memory that stores pixel information. In accordance with the invention, a buffer also includes a processor, or datapath, that manages and manipulates the information stored in the memory. Buffers are also referred to herein as Buffer Modules or as Pixel Buffers.

Buffer Memory: The pixel memory internal to a Buffer Module.

Buffer Processor: The processor (datapath) internal to a Buffer Module that manipulates the data in the Buffer Memory.

Pixel: Each pixel received from the Scan Conversion unit 20 is described by a pixel address, which defines a location of the pixel on the screen of the Display device 16, and by pixel data, which describes the associated pixel. The pixel data may be expressed in, by example only, RGB (color), alpha (transparency), and depth (z-axis) information. Other information may also be associated with each pixel, such as pixel flags used by pixel processing algorithms.

The M-Buffer Architecture

Figure 2:
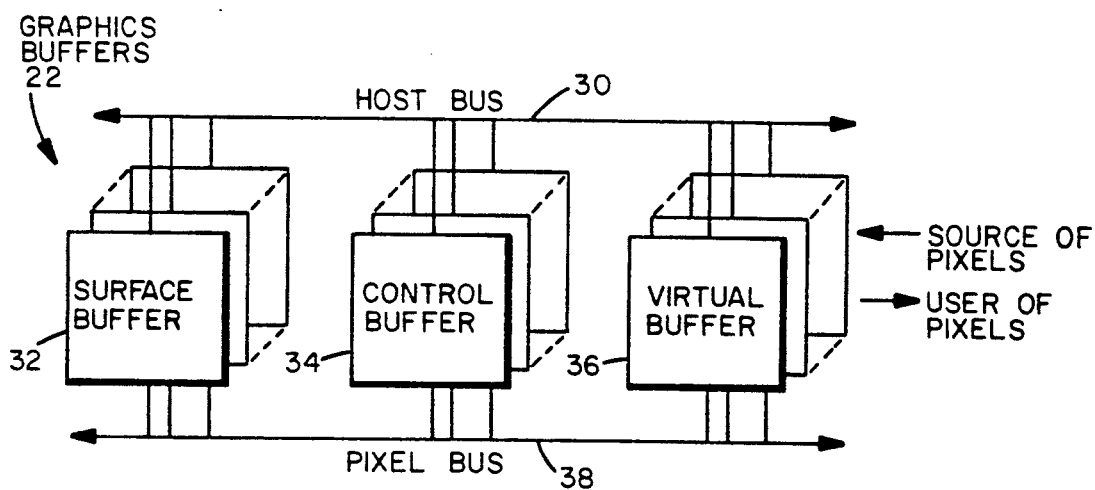
FIG. 2 is a block diagram of a Multiple Image Buffer (M-Buffer) architecture that is constructed in accordance with the invention.

FIG. 2 is a simplified block diagram of the Graphics Buffer unit 22, referred to hereinafter as the M-Buffer 22. The following is a brief description of the constituent components, each of which is discussed in greater detail below.

A Host Bus 30 is an interface used by the Host processor 12 to configure the M-Buffer 22 and to program the constituent Buffer Modules. A plurality of Surface Buffer Modules 32 store, test, and manipulate pixel surface data. One or more Control Buffer Modules 34 store, test, and manipulate pixel control planes. Virtual Buffer Modules 36 function as an interface between the M-Buffer 22 and other components of the Graphics Subsystem 14, such as the Scan Conversion unit 20 and the Display unit 24. Both the Virtual Buffers 36 and the "real" Buffers (32, 34) adhere to a common protocol for accessing a Pixel Bus 38. That is, Virtual Buffers 36 function as do the Buffers Modules (32, 34) with respect to communication over the Pixel Bus 38. However, Virtual Buffers 36 do not require, but may be provided with, physical memory for buffering pixel data and/or pixel addresses. The Pixel Bus 38 connects to all Buffer Modules (32, 34, 36) in the M-Buffer 22 and provides datapaths for transferring pixel data and pixel addresses, broadcasting pixel test results, and synchronizing the operation of Buffer Modules (32, 34, 36).

Pixel Bus

Figure 3:
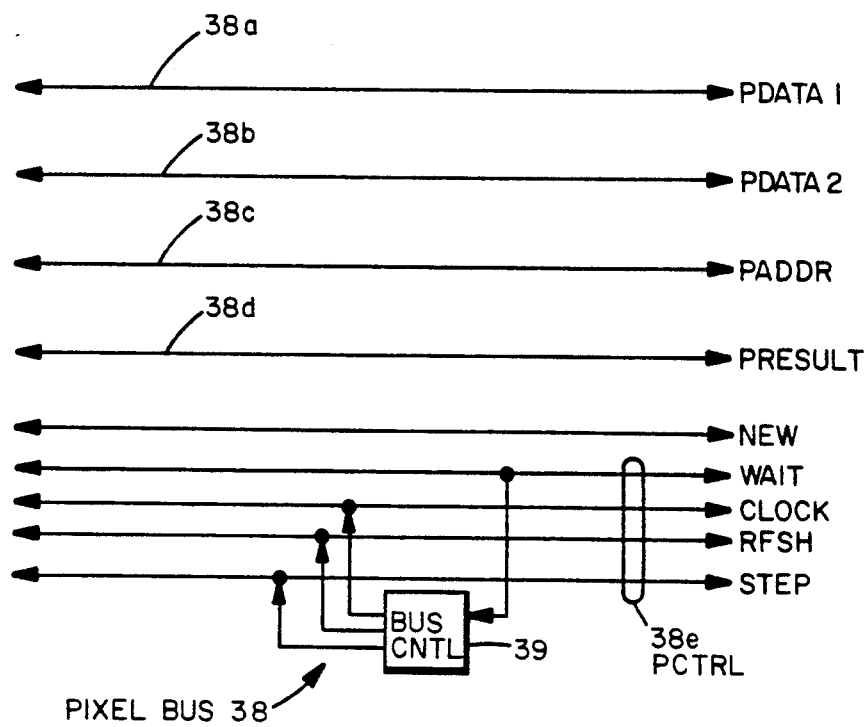
FIG. 3 shows in greater detail the Pixel Bus that is an aspect of the invention.

As seen in FIG. 3, the Pixel Bus 38 is comprised of several sub-buses that transfer information between the Buffer Modules and that synchronize the operation of the Buffer Modules. These sub-buses, for a presently preferred embodiment of the invention, are described as follows.

Two Pixel Data Buses (PData1 38a, PData2 38b) transfer pixel data between the Surface Buffer Modules 32 and the Virtual Buffer Modules 36. One of the Buffer Modules (32, 36) drives one of the Pixel Data Buses (38a, 38b). The other Buffer Modules (32, 36) either read or ignore the data on the driven Pixel Data Bus. The width of the Pixel Data Buses (38a, 38b) is a function of the wordlength of the data stored in the Buffer Memory. In a presently preferred embodiment of the invention, and not as a limitation, the Pixel Data Buses (38a, 38b) are each 32 bits wide.

It should be noted that more or less than two Pixel Data Buses may be employed in other embodiments of the invention.

The Pixel Address Bus (PAddr) 38c provides pixel addresses (pixel display screen coordinates) to other Buffer Modules (32, 34, 36). One of these Buffer Modules drives the Pixel Address Bus 38c, while all other Modules receive the address therefrom. The width of the Pixel Address Bus (38c) is sufficient to address all pixels on the intended display device 16. In a presently preferred embodiment of the invention the Pixel Address Bus 38c has 22 address lines, a number sufficient to address 1280×1024 pixels. More or less than 22 address lines could be implemented, depending on the intended application.

A Pixel Result (PResult) Bus 38d is a multi-signal line bus that broadcasts test results from each Buffer Module to all other Buffer Modules. Each line of the Pixel Result Bus 38d is driven by one Buffer Module. The other Buffer Modules respond to these lines in order to determine whether to update their internal buffer memory. That is, each Buffer Module (32, 34, 36) drives one line of the PResult Bus 38d and receives all of the lines of the PResult Bus 38d.

It should be noted that it is within the scope of the invention to provide Buffer Modules that drive more than one line of the PResult Bus 38d. For example, a Buffer Module that drives two lines of the PResult Bus 38d is enabled to express the result of a pixel comparison as being less than, equal to, or greater than.

The Pixel Control (PCtrl) Bus 38e carries signals for communication between, and synchronization of, the Buffer Modules (32, 34, 36). The PCtrl Bus 38e includes the following signals.

The signal line NEW, when asserted by a Buffer Module, indicates that there is a new pixel, i.e., pixel address and pixel data, on the Pixel Bus 38.

The signal line WAIT, when asserted, signals that at least one of the Buffer Modules (32, 34, 36) cannot complete an operation during a current Pixel Bus cycle, and requests an extension of the current cycle. By example, one of the Buffer Modules (32, 34) may be required to access a new page/column of dynamic memory, which requires additional memory set-up time.

STEP is a signal line that drives the Buffer Modules (32, 34, 36), specifically internal pipeline stages thereof as described below, through predefined PHASEs.

CLOCK is a set of lines that distribute a synchronizing clock signal to all of the Buffer Modules (32, 34, 36). In a presently preferred embodiment of the invention CLOCK has a period of 40 nanoseconds, although other periods are within the scope of the teaching of the invention.

RFSH, when asserted, signals that the Buffer Modules (32, 34) that contain dynamic memory are to perform refresh cycles in order to preserve the memory information.

Coupled to the Pixel Control Bus 38e is a Bus Control (CNTL) 39 that receives the WAIT signal and which generates the aforementioned CLOCK and STEP signals. The Bus CNTL 39 may also generate the RFSH signal.

Figure 4A:
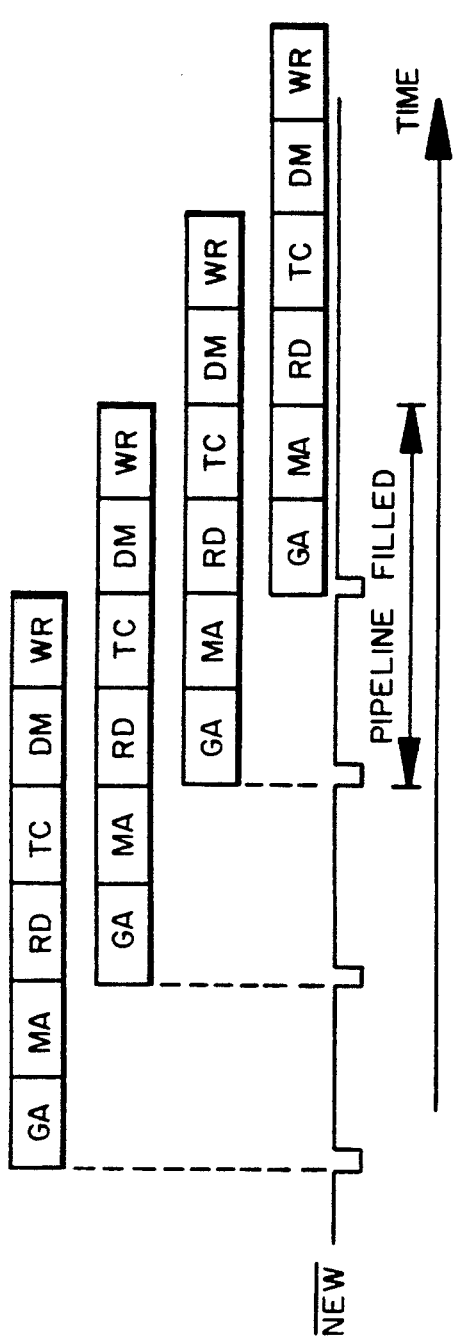
FIG. 4a illustrates a basic sequence of operation of the M-Buffer.
Figure 4B:
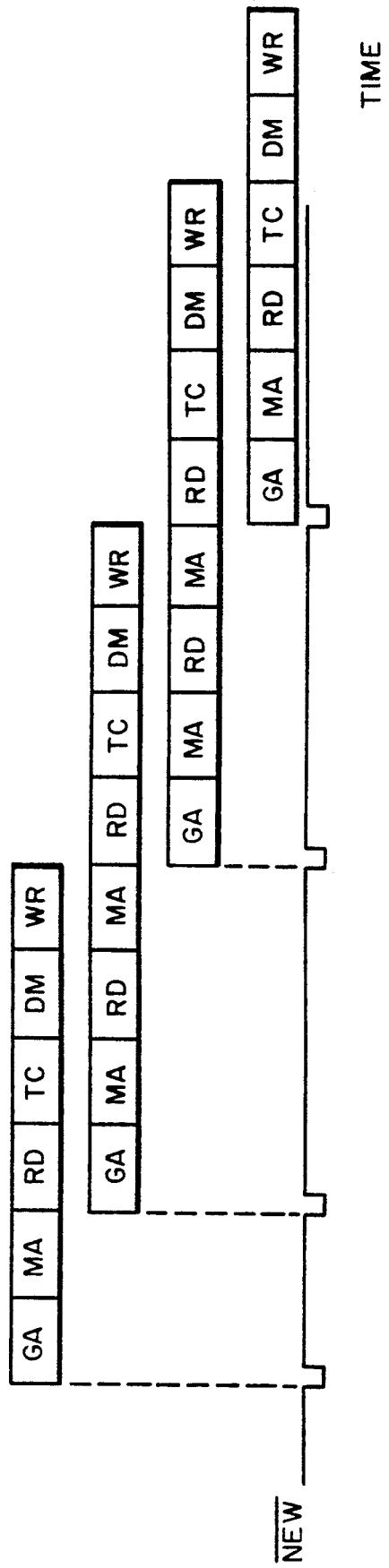
FIG. 4b illustrates an extended sequence of operations for indirect pixel addressing accomplished by the M-Buffer.

Before describing the operation of these signal lines in greater detail, and in accordance with FIGS. 4a and 4b, a description is provided of the basic sequence of operations performed by the M-Buffer 22.

Step A. Generate Address (GA): The Buffer Module (32, 34, 36) driving the Pixel Address Bus 38c generates a pixel address and drives it onto the Pixel Address Bus 38c. The Buffer Module generating the address also generates the signal NEW. This state corresponds to PHASE=0, STEP=0.

Step B. Modify Address (MA): All Buffer Modules read the address from the Pixel Address Bus 38c and may modify it. This state corresponds to PHASE=0, STEP=1.

Step C. Read (RD): The Buffer Modules use the (modified) pixel address to read data from an associated Buffer Memory 46. The Buffer Module(s) driving the Pixel Bus 38 place the data onto one of the sub-buses (PDATA1 38a, PDATA2 38b) of the Pixel Bus 38. This state corresponds to PHASE 1, STEP=0.

Step D. Test & Compute (TC): The Surface and/or Virtual Buffer Modules (32, 36) receive the Pixel Data from one or several of the sub-buses of the Pixel Bus. In response to the received data, Modules perform the following two actions.

Step D1. The data value received is tested or is compared against a second value. The test result, expressed as one bit (RESULT), is written to the associated line of the Pixel Result Bus 38d and is broadcast to all of the other Buffer Modules (32, 34, 36). As was previously noted, in other embodiments of the invention the test result may be expressed with more than one bit.

Step D2. The data value received is used to compute a new value that may be written to the associated Buffer Memory 46 in Step F (below).

Step D corresponds to PHASE=1, STEP=1.

Step E. Decide & Modify (DM): All Buffer Modules (32, 34, 36) read the Pixel Result Bus 38d and determine whether the value computed in Step D2 is written to the Buffer Memory 46. This state corresponds to PHASE=2, STEP=0.

Step F. Write (WR): If enabled in Step E, the value computed in Step D2 is written to the Buffer Memory 46. This state corresponds to PHASE=2, STEP=1.

A complete sequence of the foregoing steps is referred to herein as an operation. The steps GA+MA, RD+TC, and DM+WR each form a stage group that may be executed in parallel. These stage groups are referred to herein as PHASEs of an operation, and some or all of the stage groups can be active at a particular time. The activation of stage groups is controlled by a three bit shift register (PIPE register 154) that is described below in conjunction with the Controller 56. Each bit of the PIPE register 154 corresponds to one of the stage groups. A bit set in this shift register indicates that the corresponding stage group is active during a current phase. More than one stage group can be simultaneously active.

FIG. 4a illustrates how these steps are arranged in a 3-stage pipeline to speed up operation. As is illustrated, the 3-stage pipeline makes an access to Buffer Memory 46 in every step, if the pipeline is filled.

FIG. 4a illustrates the basic sequence of operations performed by every Buffer Module. However, some applications require addressing schemes that determine the address of a pixel based on a value stored at another pixel and/or in another buffer. Such an access mechanism is referred to as indirect addressing or mapping. For example, texture mapping determines a value to be displayed on the screen by reading a texture coordinate from a buffer. The texture coordinate is then used to address another buffer that contains a texture map having values to be displayed or processed further.

The M-Buffer 22 accommodates such operations by providing the following capabilities.

First, values read from the Buffer Memory 46 may be directed to the Pixel Address Bus 38c. This capability enables pixel values stored in the Buffer Memory 46 to be interpreted as pixel addresses.

Second, the basic sequence of operations is extended, as seen in FIG. 4b, to accommodate extra cycles for accessing a pixel value by indirect addressing. The second and third pipeline operations each include an additional MA and RD step wherein a received pixel address is used to extract a further pixel address from the Buffer Memory 46.

The M-Buffer 22 thus allows pixel accesses with several levels of indirection. FIG. 4b shows an access with one level of indirection, and further shows that extending the basic sequence of operations reduces the utilization of the Buffer Module hardware. That is, three operations are performed in parallel in the basic sequence of operations, while the average number of parallel operations is reduced to two or less when using indirect addressing.

Figure 7A:
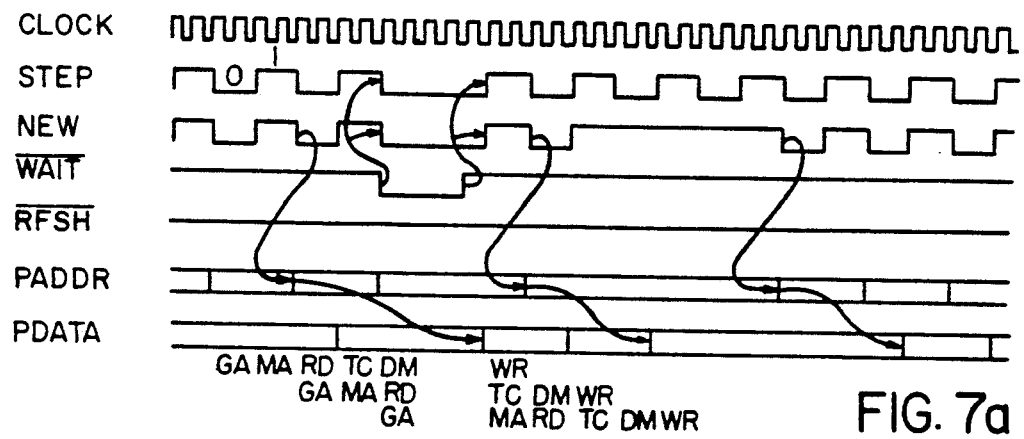
FIG. 7a is a timing diagram of the Pixel Bus having a wait cycle for a read access.
Figure 7B:
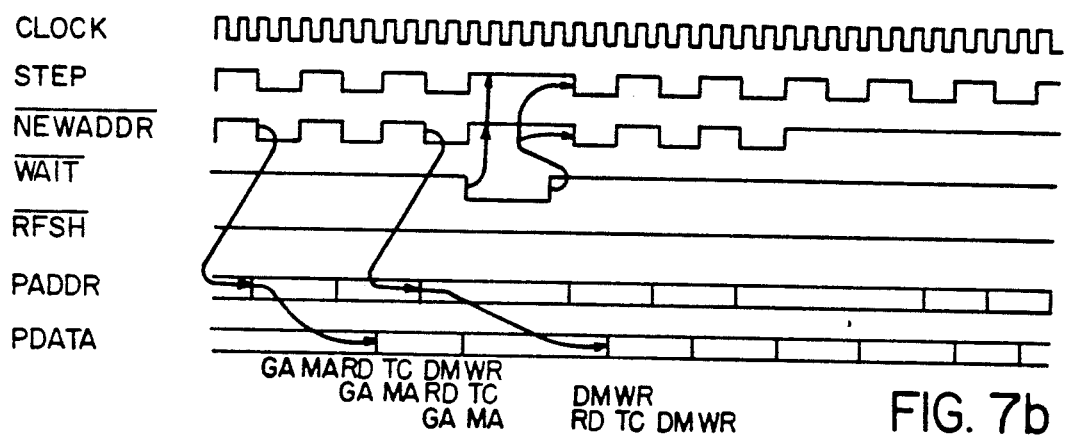
FIG. 7b is a timing diagram of the Pixel Bus having a wait cycle for a write access.
Figure 7C:
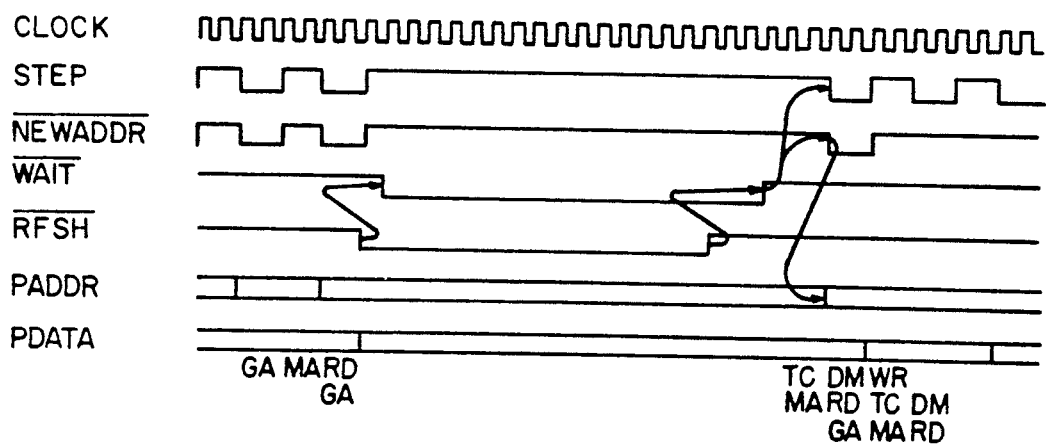
FIG. 7c is a timing diagram of the Pixel Bus showing a refresh cycle.

Referring now to FIGS. 7a–7c there is shown the timing characteristics of the Pixel Bus 38.

A new pixel address (NEW active) is asserted only during a first step of a pipeline phase (PHASE=0, STEP=0). Furthermore, a new pixel address is not applied if either RFSH or WAIT is active. In FIGS. 7a and 7b the assertion of the WAIT signal line is seen to suspend the generation of further STEP signals, thereby inserting one or more WAIT states. The first assertion of the STEP signal generates the GA pipeline step, followed by the MA pipeline step followed by the RD pipeline step. For the illustrated embodiment, the WAIT state is inserted, for the first pixel, between the DM and the WR steps. For the second pixel the WAIT state is inserted between the RD and TC steps, and for the third pixel the WAIT stage is inserted between the GA and the MA steps. That is, the read access executed for the second pixel causes the assertion of the WAIT signal line. For FIG. 7b, the execution of the write access (WR) for the first pixel causes the assertion of the WAIT signal line.

As can be seen in FIG. 7c, a refresh cycle is requested by asserting RFSH during the second step of a pipeline phase (STEP=1). The refresh is executed as soon as the current pipeline step is completed. After deasserting RFSH the refresh cycle is completed and normal operation is continued.

The WAIT signal is activated at the beginning of a memory access that requires a new memory page. The WAIT signal is deasserted one CLOCK cycle before the memory access is completed. WAIT is also active during refresh operations to ensure that, after the RFSH signal is deasserted, all pixel buffers can complete pending refresh cycles.

Surface Buffers

The Surface Buffers 32 form a general purpose buffer resource for the M-Buffer 22. They store data that is usually associated with surfaces to be displayed, such as, but not limited to, depth values, color values, and alpha values. The application program, running on the Host Processor 12, determines how and for what purpose these buffers are used.

Figure 5A:
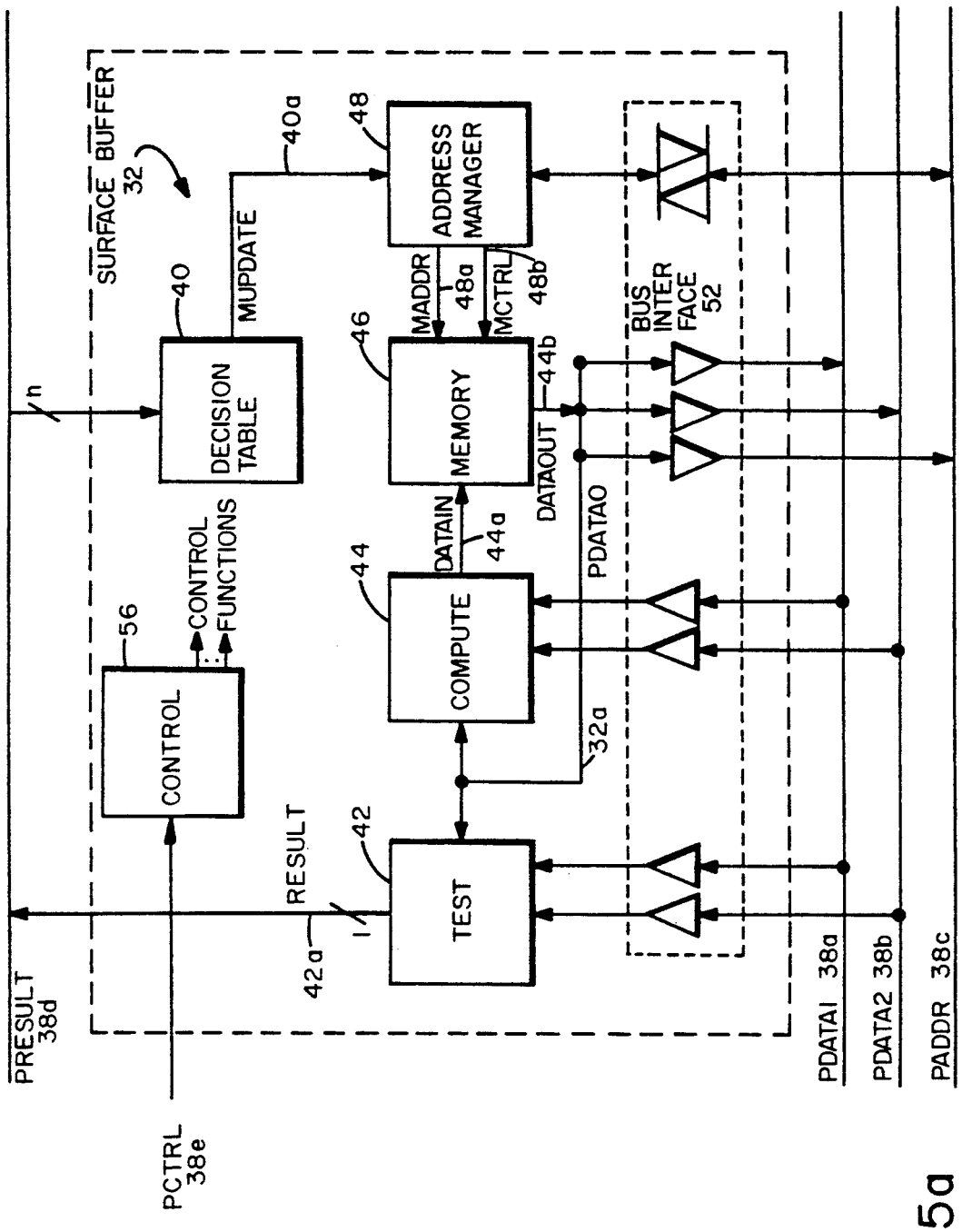
FIG. 5a is an overall block diagram of a Surface Buffer that is a component of the M-Buffer.

As seen in FIGS. 5a and 5b, the Surface Buffer Modules 32 are constructed from several blocks. The blocks perform a host-programmable function specified by writing information, over the Host bus 30, to registers contained within these blocks. The following describes each constituent block of the Surface Buffer Module 32.

The Decision Table 40 (FIG. 5f) controls a memory update signal MUpdate 40a. The Decision Table 40 implements a boolean function of as many variables as there are lines received from PResult Bus 38d, i.e., for this embodiment of the invention, as many lines as there are Buffer Modules. The MUpdate 40a function is TRUE when the pixel update condition is met, and FALSE otherwise.

More specifically, updating of the Buffer Memory 46 occurs only under certain conditions that are formed by the results reported by the associated Test units 42 of all of the Buffer Modules (32, 34, 36). The result bits together form an address into the Decision Table 40. In a presently preferred embodiment, the Decision Table 40 includes two static RAMs 60a and 60b. The size of the SRAMs used for the Decision Table 40 is a function of the maximum number of pixel buffers. Assuming, by example, that the M-Buffer 22 includes n Surface Buffers 32, one Control Buffer 34, and two Virtual Buffers 36, the size is $2^{n+3}$ by 1 bit. SRAMS 60a and 60b are loaded via a Host Bus 30 interface 62. The lower four bits of the PResult bus 38d selects one of the 16 bits read from the RAMs 60, via multiplexer 64 and logic 60c. The Host processor 12 writes data into the RAMs 60 by performing a register write action (HWR). The data is written in the RAM 60 location pointed to by the contents of a counter 66. RAM 60 data may also be read by the Host by asserting HRD in conjunction with a select signal A13. The Host address bus (HAddr 30b) is applied to decoder 68 to generate one of two select signals A12 and A13. A12 enables the loading of the Host data from the HData bus 30a into the counter 66. The A13 select signal increments the contents of the register-counter 66 and also enables the output of same onto the RAM 60 address bus 68. When A13 is not asserted a buffer 68a places the PResult bus 38d onto the address bus 68. Also, logic 60c gates bit 3 of the PResult bus 38d to select between SRAM 60a and SRAM 60b. The output of multiplexer 64, selected by bits [0:2] of the PResult bus 38d, is stored within a one-bit register 70 and forms the MUpdate signal 40a. The MUpdate signal 40a is either a zero or a one, depending on the logical states of all of the PResult bus 38d signal lines and on the preprogrammed content of the addressed location of SRAM 60a or SRAM 60b.

The Test datapath 42 (FIG. 5e) performs pixel tests using two out of three criteria. Specifically, the Test datapath 42 uses data from the Pixel Bus 38 (one or both of the sub-buses PData1 38a, PData2 38b), an internal data bus PData0 32a, or a reference value stored within the Test datapath 42. The result of a test is expressed as the signal Result 42a, which is connected to and drives one line of the Pixel Result Bus 38d. The reference value can be use in one of two ways. It can be employed for comparison against another pixel value, or as a tolerance value that is added to one of the two values that are compared. Specified bits of the two data items being compared may be masked through the use of a Readmask register 72.

More specifically, the Test datapath 42 is connected to the Host bus 30 and to the Pixel Bus 38. The Result 42a output is driven to the PResult bus 38d. The operation of the Test datapath 42 is controlled from a Status Register 152 and the Pipeline Register 154 (described below) of the Control 56. A comparator 74 implements, under control of a Test register 76, a set of tests, which are shown in Table 1.

TABLE 1

| OPERATION | DESCRIPTION |
| --- | --- |
| NEVER | Comparison always returns FALSE. |
| LESS | $A < B$ |
| LEQUAL | $A \leq B$ |
| EQUAL | $A = B$ |
| NEQUAL | $A \neq B$ |
| GEQUAL | $A \geq B$ |
| GREATER | $A > B$ |
| ALWAYS | Comparison always returns TRUE. |

The specific test to be performed is selected by the contents of the Host processor 30 loaded Test register 76. Furthermore, the contents of the Test register 76 determines whether the value stored within the Reference register 78 is added to the first argument of the comparison. The first argument is generally received from PDATA0 32a, which is the output of the Buffer Memory 46. The 32-bit Readmask register 72 is loaded with zeros for those bits that are to be ignored during the comparison. A multiplexer group 80, in conjunction with an adder 82, provide the A and B inputs to the comparator 74. The result of the comparison is written to a register 84 that interfaces the Test datapath 42 to the PResult bus 38b. The output of the comparator 74 is written to register 84 if the incoming data is valid, i.e., the pipeline stage TC is active. This is signalled by a combination of PHASE[1], which is an output of the PIPE register 154, and the STEP signal.

The Compute datapath 44 (FIG. 5d) receives the same inputs as the Test datapath 42. Based on these inputs the Compute datapath 44 calculates a new pixel value expressed as DataIn 44a. However, this value is written into the Buffer Memory 46 only if the memory update condition, as determined by the Decision Table 40, is met.

More specifically, the Compute datapath 44 transforms the value of a pixel according to a specified operation. This transformation may combine any two of the following three data elements: (a) a pixel value read from the pixel memory 46; (b) a pixel value read from either PDATA1 38a or PDATA2 38b; and (c) an operand stored within the datapath within a Host processor 12 loaded Operand register 90. The result of the operation is further modified according to the contents of a Writemask register 92 that is also loaded by the Host processor 12. The operation itself is specified by the contents of an Operation register 94 via a multiplexer 94a. The Compute datapath 44 includes an ALU 96 that executes a specified set of operations described in Table 2.

TABLE 2

| OPERATION | DESCRIPTION |
|---|---|
| ADD | A plus B |
| SUBA | B minus A |
| SUBB | A minus B |
| AND | A and B |
| OR | A or B |
| XOR | A exor B |
| NAND | A nand B |
| NOR | A nor B |
| NXOR | A exnor B |

The operation is selected by the contents of the Operation register 94, in conjunction with the ALU 96. Simpler operations, e.g. setting the ALU output to Zero or copying one of the inputs to the ALU output, are obtained by loading the Operand register 90 with an appropriate value.

Two bits of the Operation register 94 select the inputs to the ALU 96 in accordance with Table 3.

TABLE 3

| ALU INPUT A | ALU INPUT B |
|---|---|
| Buffer Memory 46 | Pdata1 38a or Pdata2 38b |
| Buffer Memory 46 | Operand register 90 |
| Operand register 90 | Pdata1 38a or Pdata2 38b |
| Operand register 90 | Operand register 90 |

The Writemask register 92 is loaded with zeros where it is desired to maintain the original contents of a Buffer Memory 46 location unchanged. This is accomplished by routing the Pdata0 bus 32a around the ALU 96 and gating selected bits thereof through a multiplexer 98.

The final result is written to a register 100 that sources the DataIn Bus 44a that is input to the Buffer Memory 46. The final result is written to register 100 if the incoming data is value, i.e. the pipeline stage TC is active. This is indicated by a combination of PHASE[1], an output of the aforementioned PIPE register 154 in the Controller 56, and the STEP signal.

The Buffer Memory 46 stores the pixel data. The Buffer Memory 46 is constructed with semiconductor memory, preferably dynamic random access memories (DRAM). The Buffer Memory 46 is controlled and accessed by an Address Manager 48, via a Memory Address (MAddr) bus 48a, and a Memory Control (MCtrl) bus 48b. Data is written into the Buffer Memory 46 by the Compute datapath 44 via the DataIn bus 44a. The output of the Buffer Memory 46 is a DataOut bus 46b which is connected to the internal Pixel Data bus (PData0) 32a.

Figure 8A:
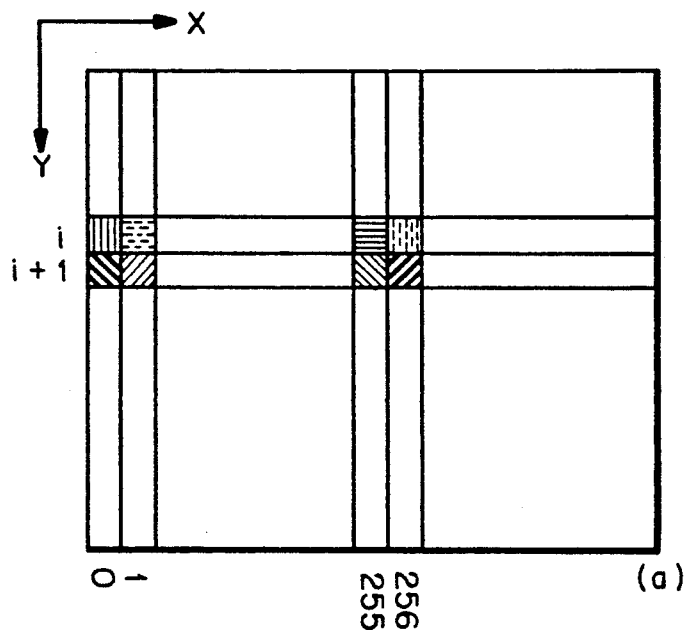
Figure 8B:
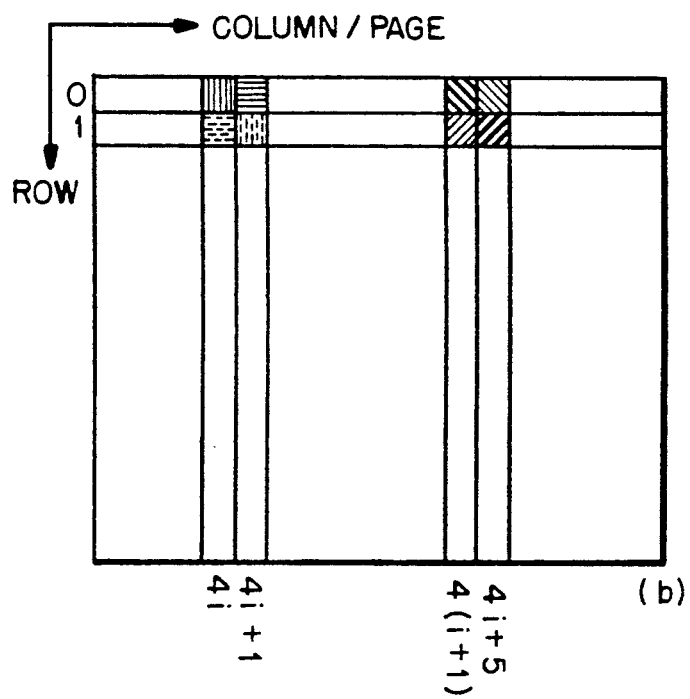

In a presently preferred embodiment of the invention the Buffer Memory 46 is organized as 1024 × 1024 pixels, wherein each pixel is represented by 32 bits. The Buffer Memory 46 is constructed of, by example, 32 planes of DRAM devices that provide for page-mode accesses. The pixels are stored within the Buffer Memory 46 in row-major form, i.e., each scanline is partitioned into four segments of 256 pixels per segment. As can be seen in FIG. 8b, each scanline segment is stored in one page of the Buffer Memory 46.

This particular memory organization is selected because many applications make extensive use of pixel transfer between pixel buffers. In that pixel transfer is commonly done on a scanline-by-scanline basis, it is important to efficiently access pixels within one scanline.

It should be realized, however, that a number of different Buffer Memory 46 organizations may be employed. For example, eight banks of memory could be employed to store the scanline segments of two adjacent scanlines, wherein the pixel addresses of two scanlines are all in a same page of each of the different banks. As such, the pixel and memory organization shown in FIGS. 8a and 8b is not intended to be read as a limitation upon the practice of the invention.

The Address Manager 48 operates to generate and modify pixel addresses. These addresses are applied to the Buffer Memory 46 and, if configured accordingly, to the Pixel Address Bus 38c. The Address Manager 48 also controls the operation of the Buffer Memory 46 by generating the MCtrl signals 48b. As was noted above, Buffer Memory 46 write operations are initiated only if the signal MUpdate 40a is asserted.

The Address Manager 48 responds to several commands. These include the following:

GENERATE—Generate pixel addresses for all pixels within coordinates that define a screen box;

HOLD—Maintain the value of the screen box coordinates unchanged; and

TRACKAddr—Generate a bounding box defined by coordinates of all pixels that have appeared on the PAddr bus 38c.

TRACKUpd—Generate a bounding box defined by all pixels that were updated in the associated Buffer Memory.

The Address Manager 48 also responds to a RESET command, wherein LEFT and TOP registers (50b, 50d) are loaded with a large value (0×ff . . . f) and the RIGHT and BOTTOM registers (50a, 50c) are loaded with Zero. Thus, LEFT>RIGHT and TOP>BOTTOM. This describes a "negative" pixel bounding box, assuming that y=0 is located at the top of the screen and x=0 is at the left of the screen.

The Address Manager 48 can be configured in one of two modes, specifically a passive mode and an active mode.

In the passive mode the Address Manager 48 reads pixel addresses from the Pixel Address Bus 38c and propagates the addresses to the Buffer Memory 46. The Address Manager 46 is programmable to dynamically construct the screen box enclosing pixels being read from the Pixel Address Bus 38c (TRACK cmmands), either for all pixels that have been transferred on the Pixel Bus 38 (TRACKAddr command) or for only those pixels that have been updated in the associated Buffer Memory 46 (TRACKUpd command). The screen box coordinates are stored in the registers (50a, 50b, 50c, 50d) that contain the minimum and maximum X and Y pixel coordinates (left, top, right, bottom). Registers 50a–50d are readable by the Host processor 12 over the Host bus 30 in order to determine if a screen update has taken place, and which screen area was affected. For initialization purposes, registers 50a–50d are reset to a zero-area screen box (RESET command). The Address Manager 48 may also be programmed to discontinue updating the registers that define the screen box, without affecting the contents of these registers (HOLD command).

In the active mode, the same internal registers 50a–50d that are used for constructing a screen box are used to define a rectangular screen area for which the Address Manager 48 generates pixel addresses. The contents of the registers 50a–50d that define the screen box coordinates are programmed externally by the Host Processor 12, or are programmed by the result of a previously executed TRACK command. The sequence in which the pixel addresses are generated is programmed by specifying a first pixel address to be generated. The generated address is written to the Pixel Address Bus 38c through a Bus Interface 52 that couples the output of the Address Manager 48 to the PAddress Bus 38c. As in the passive mode, the pixel address is also passed to the Buffer Memory 46.

The pixel address that is passed to the Buffer Memory 46, either received from the Pixel Address Bus 38c or internally generated, may be modified by adding an offset value thereto. To accomplish this function, the Address Manager 48 includes an xoffsett register 54a and a yoffset register 54b. The Address Manager 48 is programmable to add the stored offset (a) never, (b) only for read operations, (c) only for write operations, or (d) for both read and write operations. This capability allows the pixel address to relate different screen areas, e.g. for copying pixels.

Figure 9A:
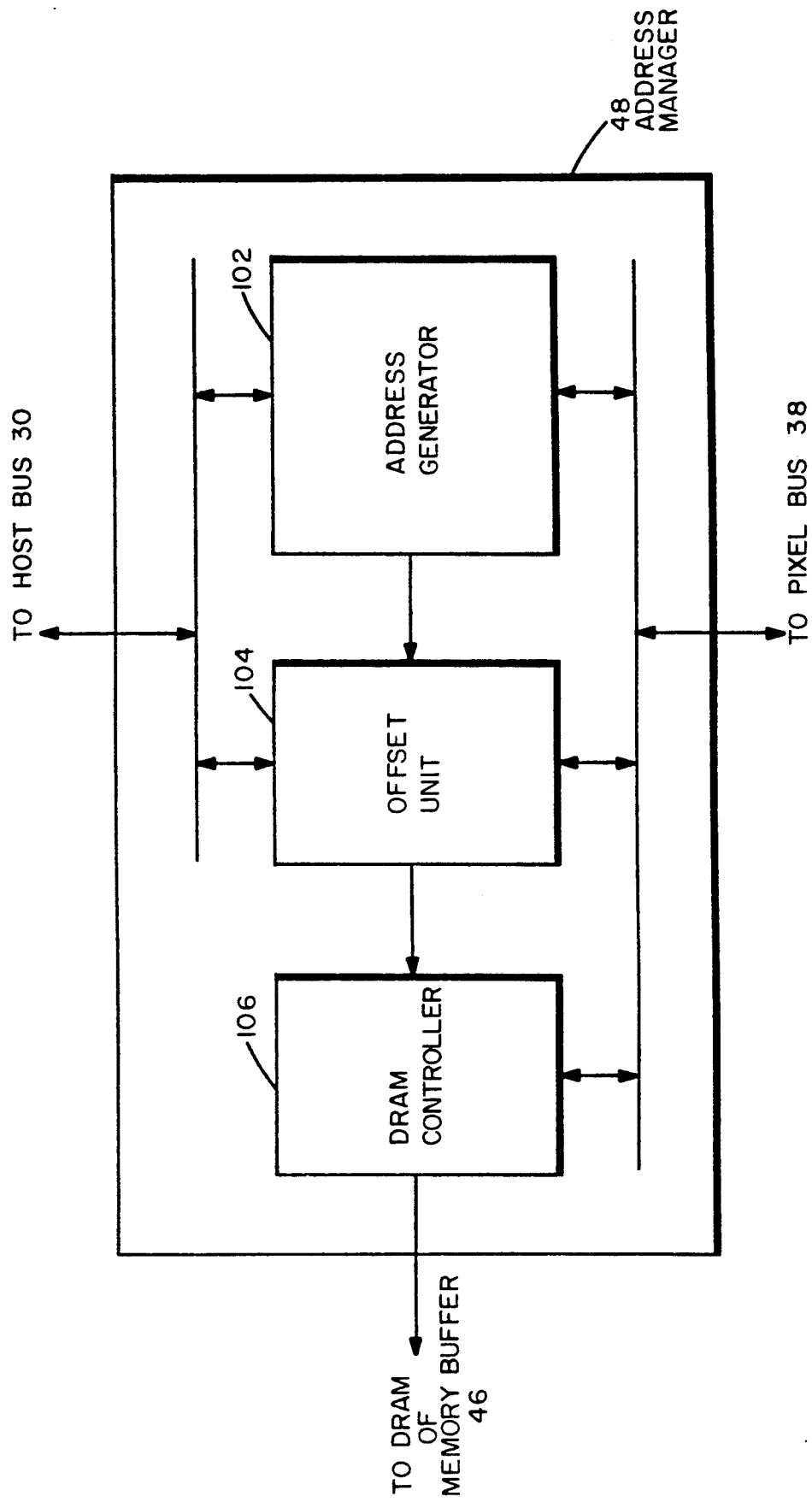
FIG. 9a is a block diagram showing the structure of an Address Manager that is a component of the M-Buffer.

More specifically, and referring to FIG. 9a, the Address Manager 48 includes an address generator 102 that provides an address for accessing the Pixel Memory 46. The address generator 102 operates by either generating an address using the internal registers or by reading an address from the Pixel Bus 38. This address is then passed to an offset unit 104 where the address may be modified in accordance with a programmed offset. The address output of the offset unit 104 is provided to a DRAM controller 106 that provides the necessary DRAM row and column addresses, in conjunction with the required DRAM timing signals (RAS, CAS, etc.) to the Buffer Memory 46.

Figure 9B:
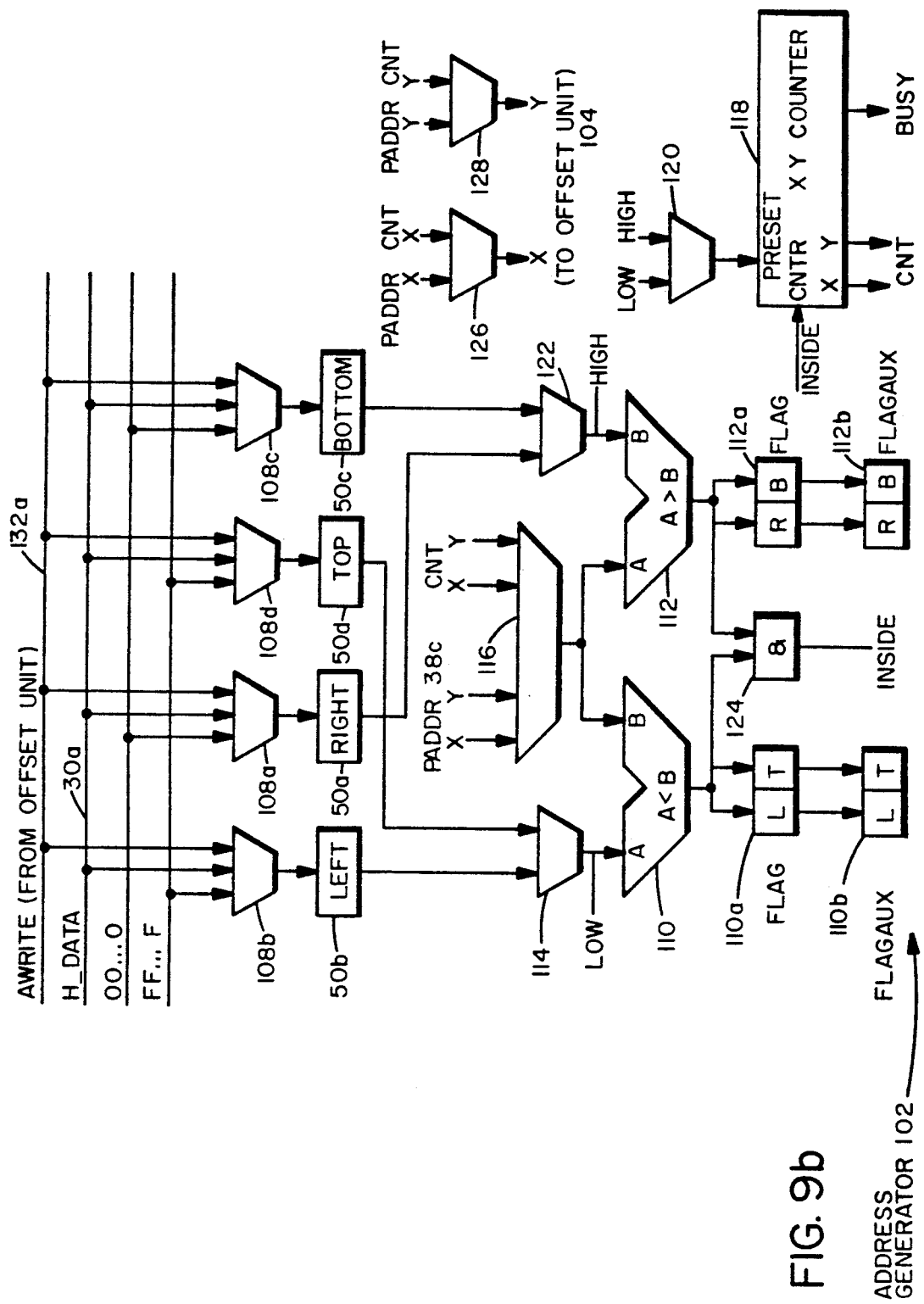
FIG. 9b is a block diagram showing in greater detail the construction of an Address Generator component of the Address Manager.

FIG. 9b shows in greater detail the construction of the address generator 102. The address generator 102 includes the RIGHT 50a, LEFT 50b, BOTTOM 50c, and TOP 50d registers These registers 50a–50d may be directly loaded, via multiplexer group 108, from the Host processor data bus 30a or may be loaded from an address stored within the offset unit 104 (AWRITE). These registers may also be set to all zeros or to all ones. The address generator 102 includes a first comparator 110 that performs a ($\geq$) function and a second comparator 112 that performs a ($\leq$) function. The A input to comparator 110 is provided from a multiplexer 114 that selects either the output of the LEFT register 50b or the TOP register 50d. The B input of comparator 110 is provided from a multiplexer 116 that selects either the pixel address appearing on the PAddress bus 38c or a pixel address (CNT XY) generated by an XY-Counter 118. The Counter 118 may be preset with the output of the multiplexer 114 (LOW), or with the output (HIGH) of multiplexer 122, via a multiplexer 120. As such, the Counter 118 is programmable to begin scanning at any one of the four corners of the defined screen box. The counter 118 also generates a BUSY signal that is provided as a read-only status signal to a STATUS register 152 that is described below.

The A input of the comparator 112 is provided by the multiplexer 116. The B input to comparator 112 is provided via multiplexer 122 that selects between the output of the RIGHT register 50a or the BOTTOM register 50c. The outputs of the two comparators are provided to a logic block 124 that generates a signal (INSIDE) if the results of the comparison of the pixel address with the stored screen box coordinates indicates that the pixel address is "inside" of the defined screen box. The INSIDE signal is used as an enabling control input for the xy-counter 118 so that the counter generates pixel addresses only for a screen region defined to be "inside" of the defined screen box.

In that the address generator 102 needs to complete its task within one pipeline cycle, i.e., only every other pipeline phase, the computations for X and Y coordinates are distributed over two pipeline phases. During the first phase the X coordinates are updated and during the second phase the Y coordinates are updated. Either the X and Y address from the pixel address bus 38c, or the address generated by the XY-Counter 118, is output to the offset unit 104 via X-multiplexor 126 and Y-multiplexor 128.

In regard to the TRACK commands previously described, the expressions (P_ADDR.?>=???) and (P_ADDR.? <=????) are determined by the comparators 110 and 112, respectively, in two consecutive steps. The results of these tests are stored in four flip-flops 110a and 112a designated as FLAGi (i=left, right, top, bottom) and later used to qualify the update signals for the LEFT, RIGHT, TOP, BOTTOM registers 50a–50d.

For example:

$$FLAGleft = (P\_ADDR. \times < LEFT).$$

In that these tests are performed during the steps GA and MA, but the screen box registers 50a–50d are only updated during the WR step, the pixel address must be temporarily saved. This is done by the Offset Unit 104 using the register AWRITE 132, as described in detail below.

For the same reason, namely that the next set of flags (FLAGi) is generated before the first set of flags is used, there is a second set of flip-flops 110b and 112b, designated as FLAGi_AUX, that receive the value from the FLAGi flip-flops 110a and 112a during the step TC.

During the WR step the contents of the register AWRITE 132 is conditionally copied to the registers LEFT, RIGHT, TOP, BOTTOM (50a-50d).

The condition for this data transfer is, for the TRACKAddr command:

FLAGi_AUX and PHASE[2] and STEP;

and for the TRACKUpd command:

FLAGi_AUX and MUpdate and PHASE[2] and STEP.

The TRACKAddr command performs the update for all pixels on the PAddress bus 38c that are outside of the current screen box. For the TRACKUpd command, this in only performed if the corresponding pixel in the Buffer Memory 46 has been changed, i.e. MUpdate=1.

The following Table 4 summarizes the TRACK command operation:

TABLE 4

| Phase | Step | Action |
|---|---|---|
| 1 | GA | Test X coordinates |
| 2 | MA | Write FLAGleft and FLAGright |
| 3 | RD | Test Y coordinates |
|   |    | Write FLAGtop and FLAGbottom |
| 4 | TC | Copy FLAGi to FLAGi_AUX |
| 5 | DM |   |
| 6 | WR | TRACKAddr: |
|   |    | if (FLAGtop_AUX) then |
|   |    | TOP=AWRITE.y |
|   |    | TRACKUpd: |
|   |    | if (FLAGtop_Aux and MUpdate) |
|   |    | TOP=AWRITE.y) |
|   |    | dto. for left, right, and bottom. |

Figure 9C:
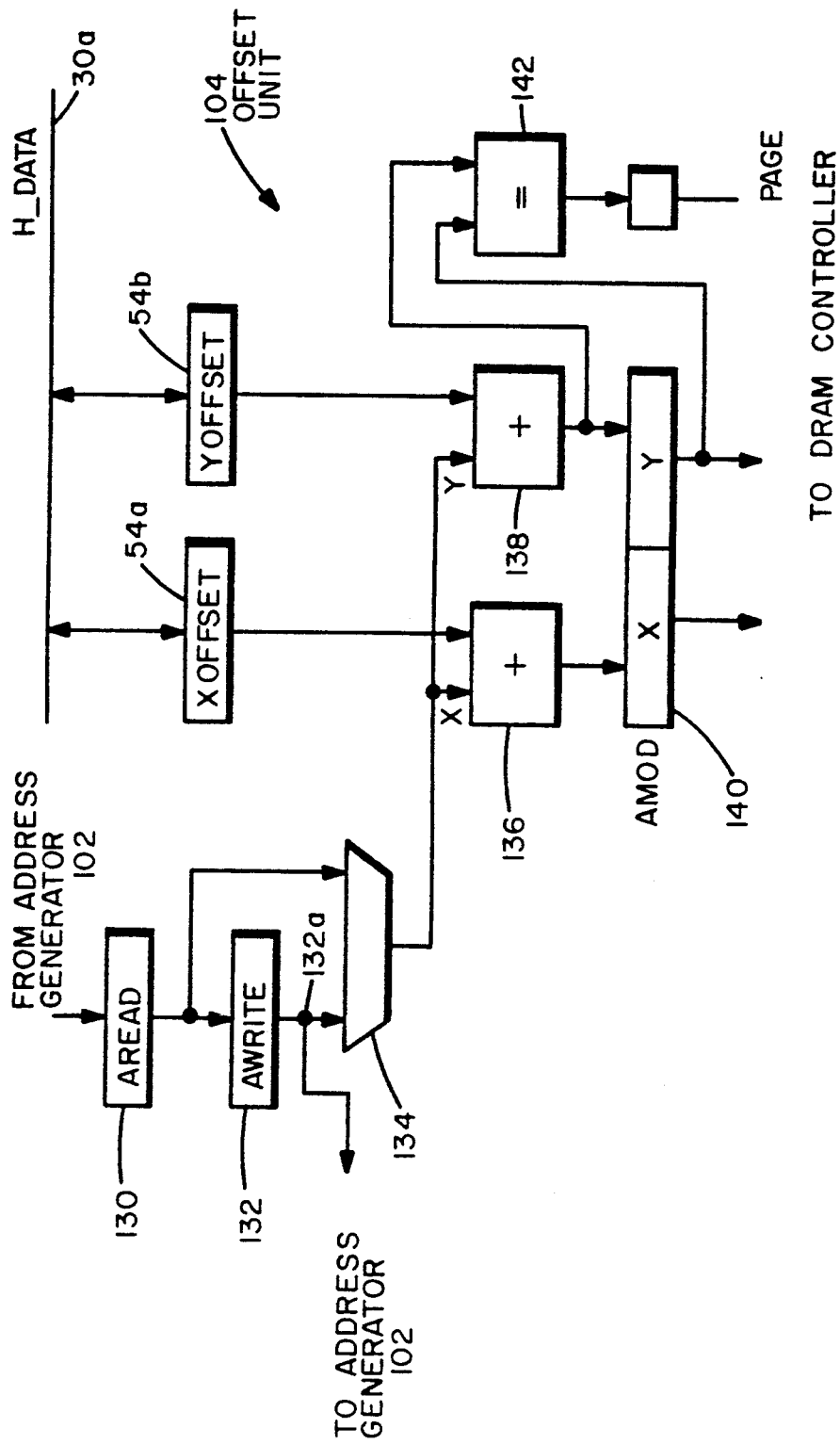
FIG. 9c is a block diagram of an Address Manager Offset unit.

FIG. 9c illustrates in greater detail the construction of the offset unit 104. The offset unit transforms addresses received from the address generator 102 by conditionally adding offset values to the XY-Coordinates. This offset can be added for write accesses, for read accesses, or for both types of accesses to the Buffer Memory 46.

In accordance with the pipelining technique described above, the operations for consecutive pixels overlap such that the reading of a pixel's value occurs before the previous pixel is written back to the pixel memory 46. As a result, the pixel address is required to be buffered. This buffering is accomplished by registers AREAD 130 and AWRITE 132. These registers store the (unmodified) pixel memory 46 addresses for the next read access or the next write access, respectively. The AREAD register 130 receives the outputs of the multiplexors 126 and 128 of the address generator 102. After the address stored in the AREAD register 130 is used for forming the actual read address, it is transferred to the register AWRITE 132 where the address is preserved during the processing of the subsequent pixel. A multiplexer 134 selects between registers 130 and 132 and provides an output to an X-ADDER 136 and a Y-ADDER 138. A second input to the X-ADDER 136 is provided from the XOffset register 54a. A second input to the y-ADDER 138 is provided from the YOffset register 54b. Registers 54a and 54b have previously stored the respective X and Y offset values received from the Host data bus 30a. An output register that stores the modified address (AMOD) 140 forms the interface to the DRAM controller 106. Logic 142 is provided for detecting if the Y address has changed from the last access to the Buffer Memory 46. If a change is detected it is indicated that a next pixel memory 46 access will be directed to a different page of the Buffer Memory 46. The assertion of the PAGE signal causes the DRAM controller 106 to stop issuing page-mode accesses to the Buffer Memory 46. The assertion of the PAGE signal also generates a WAIT signal on the Pixel Bus 32, in that a standard access to the Buffer Memory 46 requires more time than a page-mode access. Table 5 summarizes the operation of the Offset Unit 104 and associates these operations with the steps and phases of a pixel operation.

TABLE 5

| PHASE | STEP | ACTION |
|---|---|---|
| 1 | GA | Address Generator writes AREAD. |
|   | MA | Offset Unit modifies contents of AREAD and writes AMOD. |
| 2 | RD | DRAM Controller performs read access to memory. AWRITE:=AREAD |
|   | TC |   |
| 3 | DM | Offset Unit modifies contents of AWRITE and writes AMOD. |
|   | WR | DRAM Controller performs write access to memory. |

The Pixel Bus Interface 52 configures a Buffer Module as part of the M-Buffer 22 system. It controls what information is propagated from the Pixel Bus 38 into the Surface Buffer Module 32, and what information is passed from the Surface Buffer Module 32 to the Pixel Bus 38.

The Surface Buffer Module 32 also includes a Control Block 56 for controlling the overall operation of the Surface Buffer Module 32

Figure 5C:
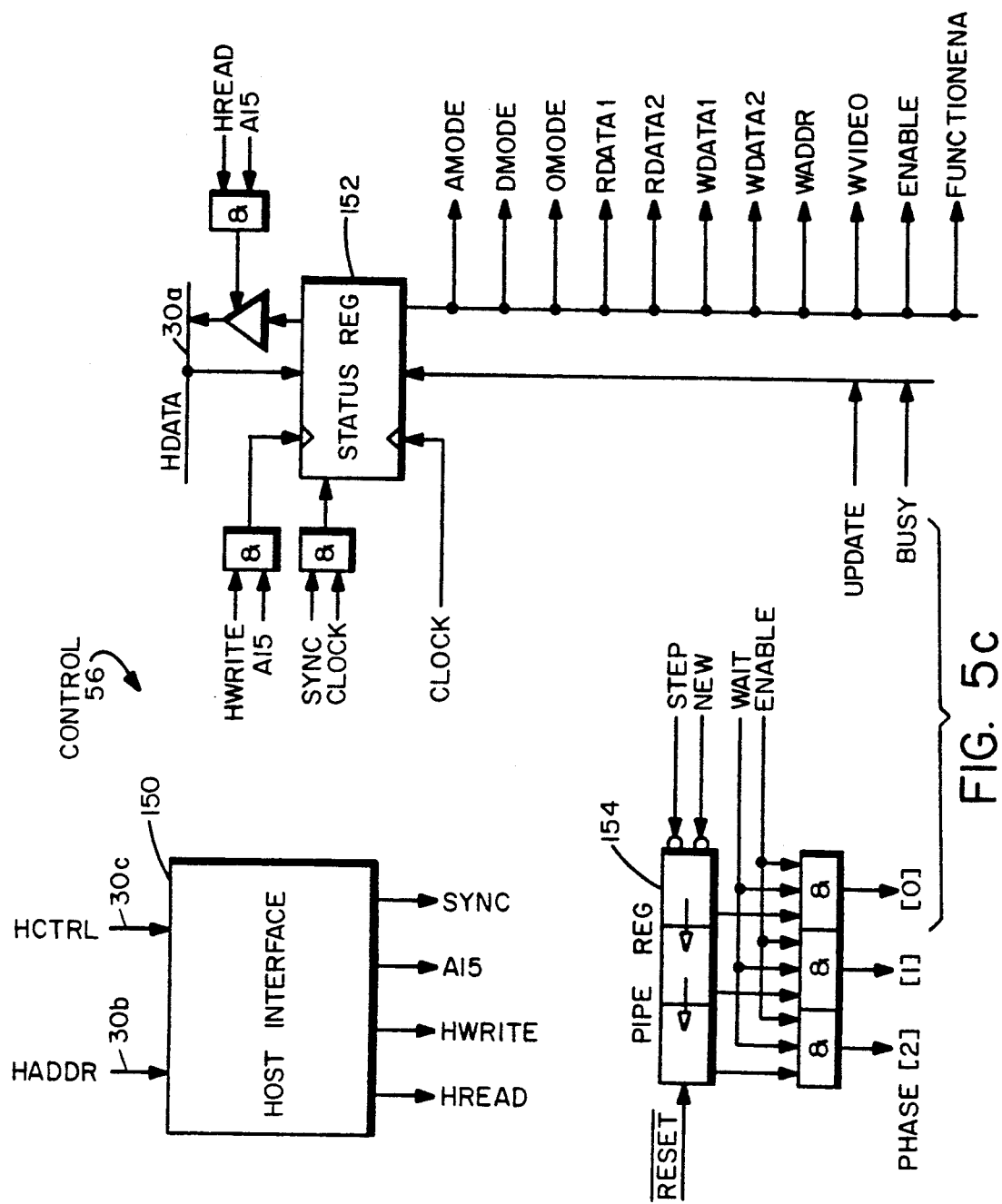
FIG. 5c is a block diagram showing in greater detail the construction of the Surface Buffer controller.

Referring to FIG. 5c, the Control Block 56 is shown in greater detail. The Control Block 56 includes three major components, a Host processor 12 Interface 150, the aforementioned Status register 152, and the aforementioned PIPE register 154. The Host Interface 150 interprets control lines (HCtrl 30c) of the Host bus 30 and identifies read and write operations to the associated Surface Buffer Module 32. If such an operation occurs the Host interface 150 sets either HRead or HWrite to indicate a Host read cycle or a write cycle, respectively. If the Host processor 12 addresses the Status register 152 the signal A15 is asserted. The signal A15 is asserted if the Host Address Bus (HAddr 30b) has the value 15 (0×0 ... 0f).

The Status register 152 is divided into two portions. The first portion can be written and read by the Host processor 12. This portion stores configuration data for the Surface Buffer Module 32. The second portion of the Status Register 152 is a read-only location and indicates the current operational status of the Surface Buffer Module 32. In the present embodiment of the invention, the read-only portion provides the BUSY status and an Update status of the module to the Host processor 12. The functions of the Status register signals are shown in Table 6.

TABLE 6

| NAME | FUNCTION |
|---|---|
| READY (BUSY) | 0: A screen region is being scanned out. 1: The buffer is not scanning out a screen region. |
| CHANGED (Update) | The buffer has been changed since the last time this flag was reset. |
| WVIDEO | This bit is used for buffer modules whose buffer memory is built from video RAMs (VRAM) used to scan out pixel information to the display device 24. If 1: the pixel information should be scanned out. If 0: no scan operation takes place. |
| ENABLE | 0: No writing to memory. Disconnect from Pixel Bus. 1: Normal operation is enabled. |
| WADDR | Drive address bus PAddress 38c. |
| WDATA2 | Drive data bus PData2 38b. |
| WDATA1 | Drive data bus PData1 38a. |
| RDATA2 | Select source data bus PData2. |
| RDATA1 | Select source data bus PData1. |
| OFFSETMODE (OMode) | Current manner of using the offset registers. |
| DIRMODE (DMode) | Current direction of scanning out a screen region. |
| ADDRMODE (AMode) | Current mode of operation for Address Generator. |
| FUNCTIONENA: | If asserted, the operation performed by the Compute datapath is determined by the OpCode (FUNCTION 34b) output from the Decision Table 40. If not set, the operation of the Compute Datapath is determined by the OpCode in the operation register 94. This bit is only employed for Control Buffers 34. |

As was previously discussed, the PIPE register 154 is implemented as a three-bit shift register. Each bit corresponds to one of the pipeline stages. A logic one in a bit position indicates that the corresponding stage is active, i.e. is "filled" with data. Conversely, a zero indicates that the stage is not active. Whenever new pixel data is placed on the Pixel Bus 38 a one is entered into the PIPE register 154 by the NEW signal, in conjunction with the STEP signal. Subsequent edges of the STEP signal propagate this logic one through the remaining stages of the PIPE register 154. The output of the PIPE register 154 is masked by logic 154a in conjunction with the incoming WAIT signal and the ENABLE status bit.

In that the PIPE register 154 is not configured as a circular shift register, every time a new pixel is generated, and NEW is asserted, a logic one is shifted into the least significant bit of the PIPE register 154 (Phase[0=]). At the same time, the information residing in the least significant bit is shifted to the next bit position in the PIPE register 154, i.e. to Phase[1]. Similarly, information is propagated from Phase[1] to Phase[2]. Therefore, up to three logic ones can reside in the PIPE register 154 at the same time.

EXAMPLES

| PIPE REGISTER 154 CONTENT | Meaning |
|---|---|
| 000 | no active pixel |
| 001 | steps GA and MA active |
| 011 | steps GA, MA, RD, and TC active |
| 111 | all steps active, pipeline full |
| 101 | steps RD and TC idle |

Control Buffers

As seen in FIG. 6, the structure of the Control Buffer Module 34 resembles that of the Surface Buffer Module 32. Differences that exist reflect the different functionality of the Control Buffer Modules 34. Elements that are common to the elements of the Surface Buffer Modules 32 are designated with primed reference numerals.

Specifically, pixel-related information stored in the Control Buffer Module 34 is typically only one or, at most, a few bits wide. In order to maintain efficiency, several of these data items are stored in the Buffer Memory 46' of Control Buffer Module 34. Therefore, the Test data path 42' and the Compute datapaths 44' operate on pixel groups that are a subset of a memory word, or 32-bits for the presently preferred embodiment.

Also, the contents of the Buffer Memory 46' are not loaded from external sources, but rather are constructed internally. For example, pixel flags are set or reset according to test results reported on the PResult bus 38d. Thus, the Control Buffer Modules 34 do not require, and do not have a connection to, the Pixel Data buses 38a, 38b.

Frequently, the operation for computing a next pixel value depends on the results of pixel tests. For example, a pixel counter is incremented if a test succeeds or is decremented if the test fails. Therefore, the operation performed by the Compute datapath 44' is dynamically selectable depending on the test results. This is accomplished by an additional Function 34b output from the Decision Table 40'. The Function output 34b selects the function performed by the Compute datapath 44', i.e. the Function output 34b conveys an OpCode to which the Compute datapath 44' responds.

Figure 5D:
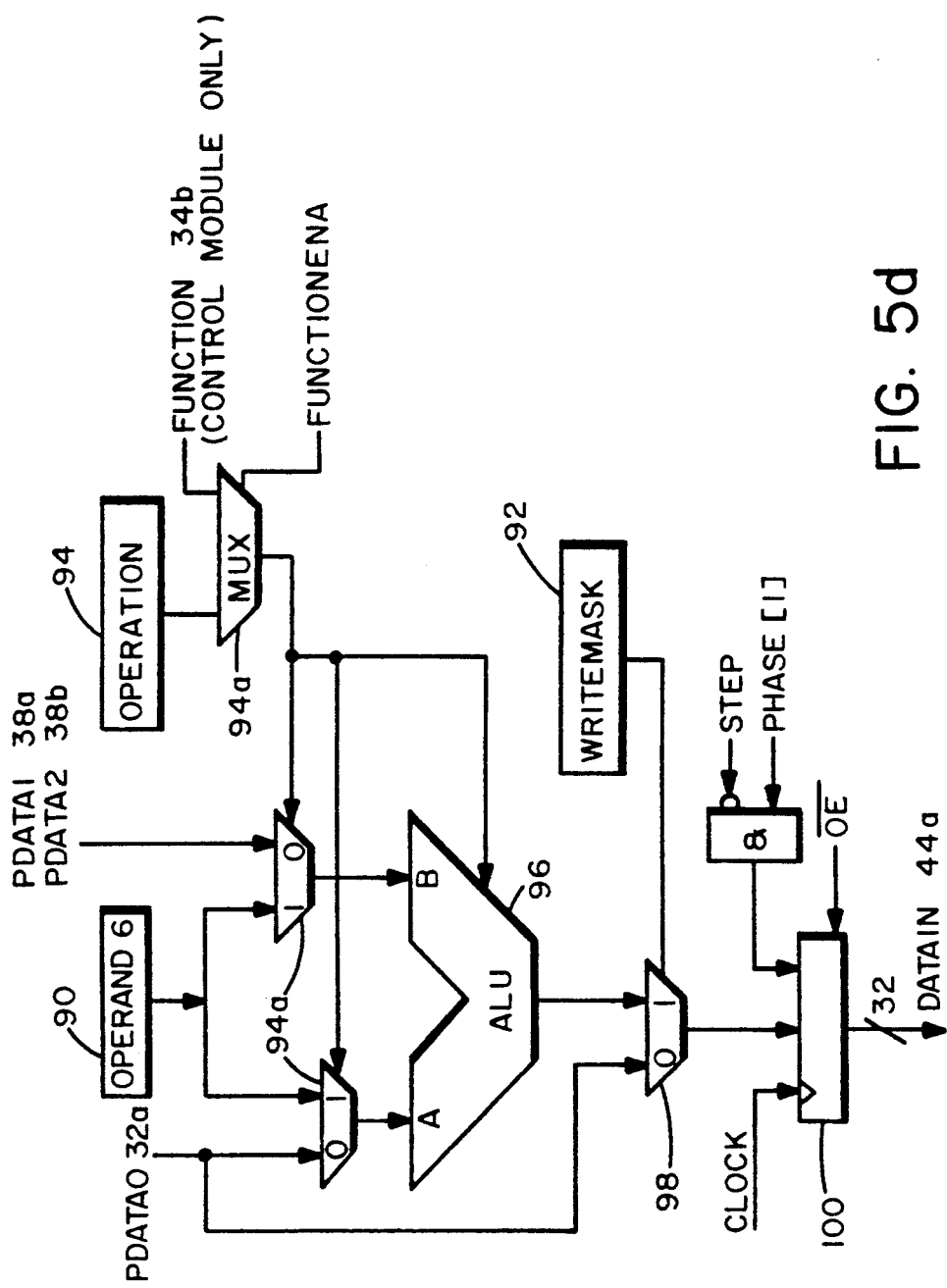
FIG. 5d illustrates the structure of the Surface Buffer data path.
Figure 5E:
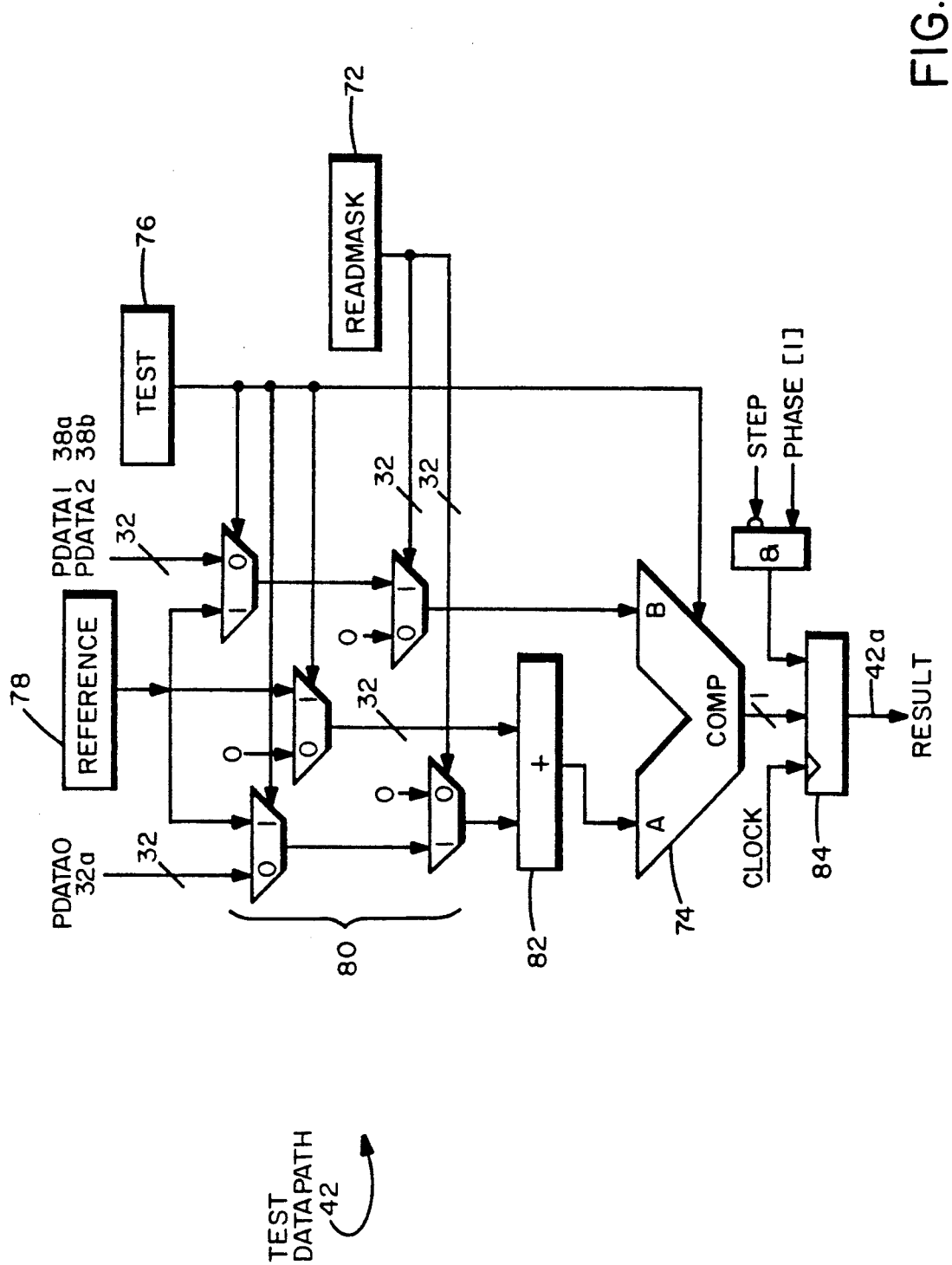
FIG. 5e shows in greater detail the structure of the Surface Buffer test unit.
Figure 5F:
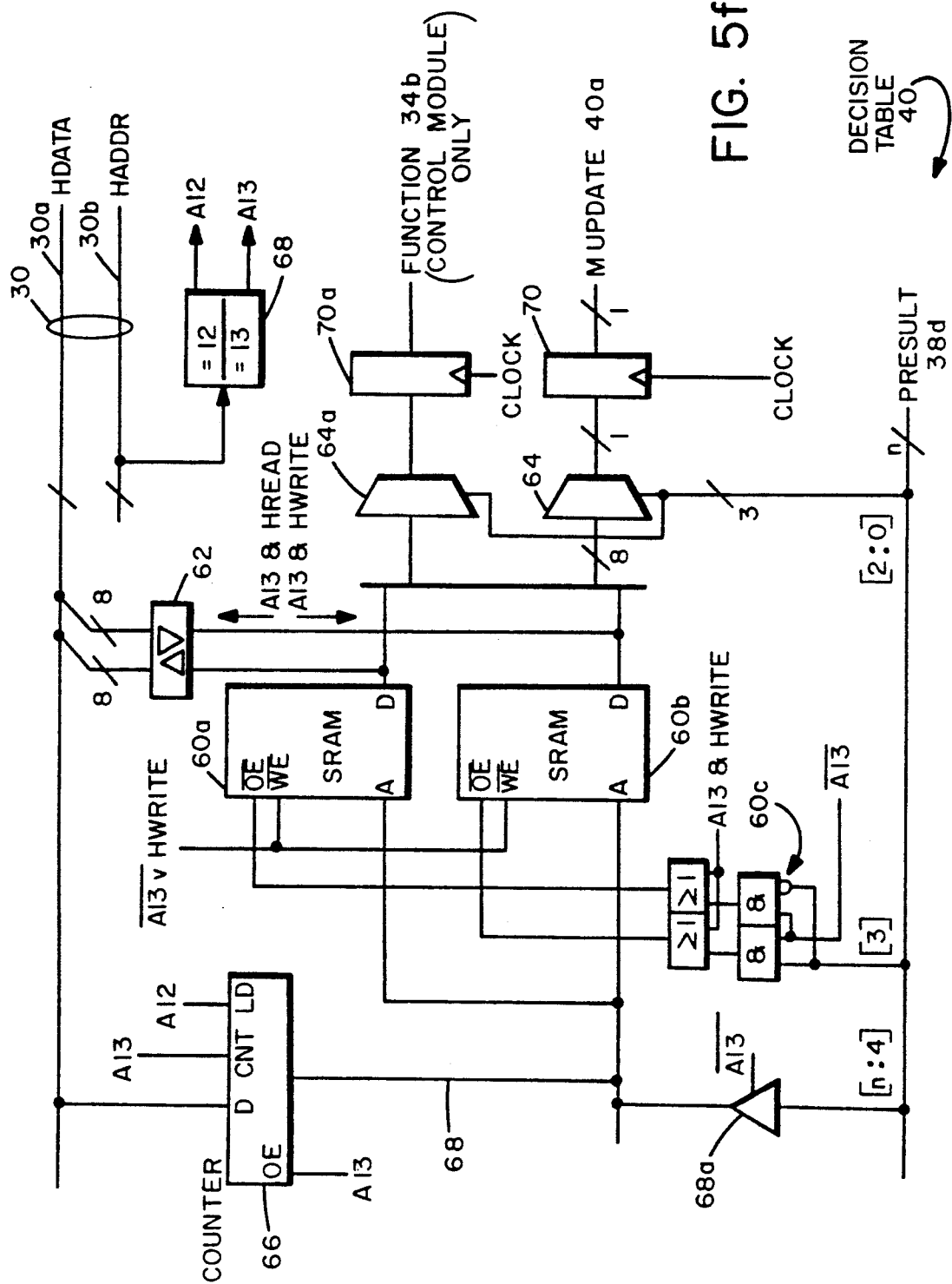
FIG. 5f shows in greater detail the construction of a Decision Table of the Surface Buffer.

More specifically, and referring to FIG. 5f in conjunction with FIG. 5d, for a Control Module 34 the Decision Table 40' includes a multiplexer 64a and an output register 70a. Bits of the PResult bus 38d select the output bits of the multiplexer 64a, which are latched by the register 70a. The output of register 70a drives the Function bus 34b. Selection between the output of the Host processor-loaded operation register 94 and the OpCode generated by the Decision Table 40 ' is obtained with the Status register 152 bit designated FUNCTIONENA, as described above. Thus, the Host processor 12 is enabled to select an operation (OpCode) for the Compute datapath 44' to be either the output of register 94 or the output of the register 70a within the Decision Table 40'.

Virtual Buffers

Other components of the graphics subsystem 10 are interfaced with the M-Buffer 22 by means of the Virtual Buffers 36. The M-Buffer 22 receives input data from, and places output data onto, the Pixel Bus 38. Virtual buffers 36 are interfaced with the Pixel Bus 38 and function as physical buffers with respect to the Pixel Bus 38. This provides a standardized means to connect different units and devices to the M-Buffer 22. This technique also removes a restriction of traditional buffer architectures that provide one designated path to funnel pixels into the buffer architecture, and other bus(es) for pixel operations. The invention overcomes these limitations by providing the central and universal bus (Pixel Bus 38) that allows the transfer of pixel information between different pixel processing stages.

Figure 10:
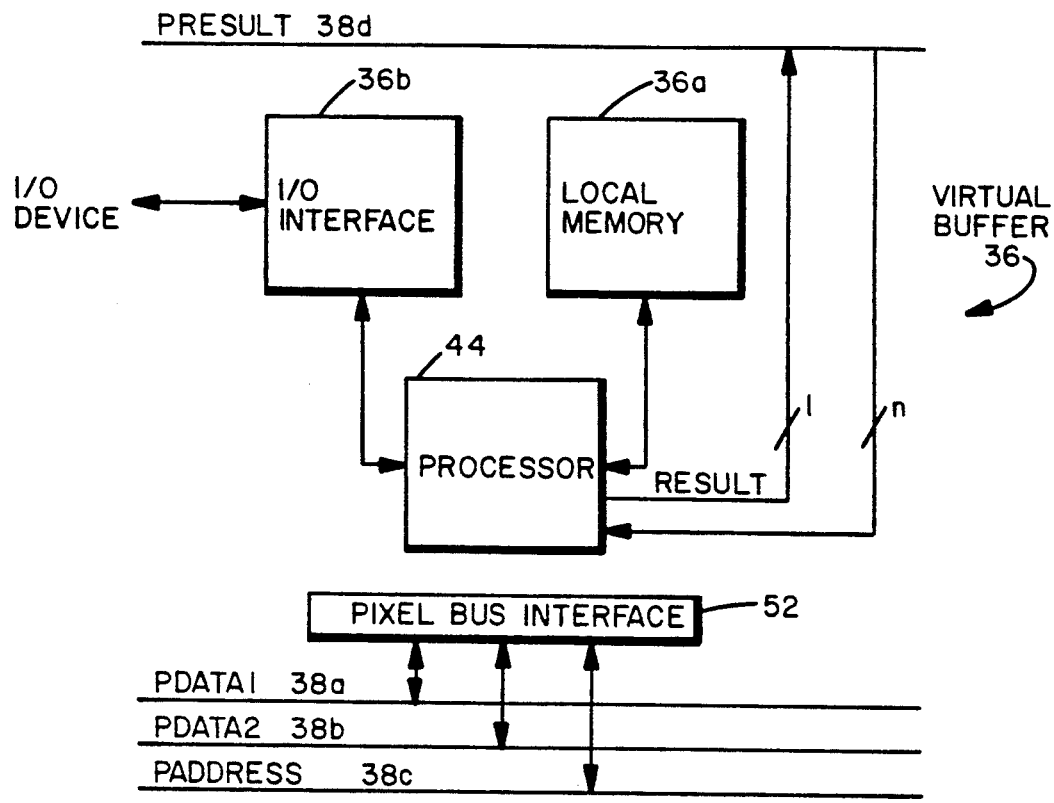
FIG. 10 is a block diagram showing one embodiment of a Virtual Buffer.

As seen in FIG. 10, the Virtual Buffer 36 offers a subset of the functionality provided by physical buffers (32, 34). For example, a Virtual Buffer 36 implementing a scan conversion unit need comprise only read-only buffers (local memory 36a) that provide pixel addresses and pixel data on the Pixel Bus 38. Other exemplary functions that can be implemented by Virtual Buffers 36 include the following.

A Virtual Buffer 36 may function as a frame buffer to provide all of the functionality of standard buffers. For this case, a second interface (I/O Interface 36b) is provided that transfers Pixel Data to the output device 24.

A Virtual Buffer 36 may function as a video buffer. For this case, the I/O Interface 36b is adapted to receive pixel information from a video source, such as a video camera. The received video data may be locally stored in the internal Buffer Memory 36a and subsequently propagated into the M-Buffer 22 through the Pixel Bus 38. For this embodiment the local memory 36a may be implemented with a First In/First Out (FIFO) Buffer.

A Virtual Buffer 36 may also function to interface input devices that generate pixel addresses for, by example, a pixel coordinate where an input event is issued by a user. These pixel coordinates are received through the I/O Interface 36b and introduced into the M-Buffer 22 through the Pixel Address Bus 38c.

It should be noted that for certain embodiments not all of the connections to the Pixel Bus 38 are required. For example, the Virtual Buffer 36 may provide data to, or receive data from, only one of the PData buses (38a, 38b). Also, for some applications the Virtual Buffer 36 may be self-contained and the I/O Interface 36 may not be required. For example, the Virtual Buffer 36 may implement a procedural texture generator that receives indirect pixel (U, V) addresses and outputs corresponding surface texture information.

Furthermore, a Virtual Buffer 36 is not required to use the PResult Bus 38d, i.e. the operation is independent of the test results. However, controlling one or several line(s) of the PResult Bus 38d can be advantageous for a Virtual Buffer 36. For example, when functioning as a rasterizer the Virtual Buffer may mark pixels as belonging to a front face or a back face by controlling a line of the PResult Bus 38d. This technique is useful in implementing the Trickle algorithm described below.

In summary, an aspect of the invention is an ability to perform multiple parallel pixel tests on the contents of the Buffer Memories 46, and to combine the results of these tests to form complex update conditions. The Test units 42 in each Buffer Module may be individually programmed by the Host processor 12 to perform different tests. These tests may take into account combinations of the pixel value read from the Buffer Memory 46, the pixel value(s) received from the Pixel Bus 38, and values stored in programmable registers internal to the test datapaths. The result of a given test (TRUE or FALSE) is broadcast to all other Buffer Modules (32, 34, 36). The combination of all test results determines whether a certain Buffer Module writes a new pixel value to its associated internal Buffer Memory 46. Independent of the specified tests, each Buffer Module also has a capability to store a boolean function, within the Decision Table 40, to define a combination of test results for which its internal Buffer Memory 46 is updated.

The flexibility of the Control Buffer Modules 34 provided by the complex update conditions is further increased by an ability to dynamically select a function to be executed by the Compute datapath 44'. Similar to the complex update conditions, the function is selected on the basis of the test results reported by all Buffer Modules. The set of functions to be executed for different combinations of test results may be programmed independently from the update conditions, also by the Host processor 12.

The M-Buffer 22 of the invention can be implemented in a number of different embodiments.

In a first embodiment, all Buffer Modules are implemented as physical buffers in hardware. The Pixel Bus 38 connects to all Buffer Modules and may be implemented as a backplane bus system.

In a second embodiment, all Buffer Modules are emulated in software on a single-processor, multi-tasking computer. The Buffer Memory 46 is allocated in virtual memory and the Buffer processors are emulated by different tasks or processes executed by the Host processor 12. Communication between the different processes, e.g. Pixel Data Buses, (38a, 38b), Pixel Address Bus 38c, and Pixel Result Bus 38d, is realized by well-established techniques. By example, pixel transfer is implemented using shared memory, and communication between processes, or Buffer Modules, is accomplished by well known inter-task communication techniques.

In a third embodiment, certain of the buffers of the M-buffer 22 are realized as physical buffers, and the remainder are emulated using software buffers allocated in virtual memory and controlled by parallel processes. The connection between the physical and software buffers is established using the Virtual Buffer 36. The Virtual Buffer 36 provides the Host processor 12, and in turn the processes emulating the Buffer Modules, access to that portion of the M-Buffer 22 that is implemented in hardware.

In a fourth embodiment, the M-Buffer 22 is emulated on a multi-processor, general purpose parallel system. Each of the processors emulates the functionality of one Buffer Module.

Having thus described the architecture of the M-Buffer 22, examples of the use of the M-Buffer 22 will now be provided so as to gain a further understanding of its functionality.

EXAMPLE 1

A first example employs the M-Buffer 22 to implement a rendering method that benefits from multiple buffers. This example is made in the context of a technique known as a Trickle Algorithm. The Trickle Algorithm is described by David A. Epstein, Frederik W. Jansen, and Jaroslaw R. Rossignac, "Z-Buffer Rendering From CSG: The Trickle Algorithm", Technical Report RC 15182, IBM Research Division, T. J. Watson Research Center, Yorktown Heights, N.Y., November 1989, and by Jarek Rossignac and Jeffrey Wu, "Correct Shading of Regularized CSG Solids Using a Depth-Interval Buffer", Proceedings of the Eurographics Workshop on Graphics Hardware, 1990, Eurographics, September 1990.

Reference is also made to commonly assigned U.S. patent application Ser. No. 07/672,058, filed Mar. 12, 1991, entitled "Direct Display of CSG Expression by the Use of Depth Buffers", by David A. Epstein, Jaroslaw R. Rossignac, and Jeffrey W. Wu.

In general, the Trickle Algorithm enables the display of Constructive Solid Geometry (CSG) objects on a raster display without converting the object to its boundary representation.

The global algorithm proceeds as follows:
1. The CSG expression is transformed into a sum-of-products form that represents the object as the union of sub-objects that are constructed as the intersection of primitive objects; and
2. each of the products is scan-converted into a product buffer (P-Buffer). After the image of a product has been completely rendered into the P-Buffer, the P-Buffer contains the visible front faces of the product. This image is merged into a union-buffer (U-Buffer), using a z-buffer.

The following pseudo-code describes these two steps:
transform the object into a sum-of-products form
initialize the U-Buffer
for each product do: compute the front pixels into the P-Buffer merge the result into the U-Buffer using a depth-buffer The computation of the visible front pixels of a product is a more complicated procedure. The main idea is that the visible surface points of a product are on the front surface of the closest, front-facing surface that lies inside all other primitives. Finding that surface requires two depth-buffers.

Figure 11:
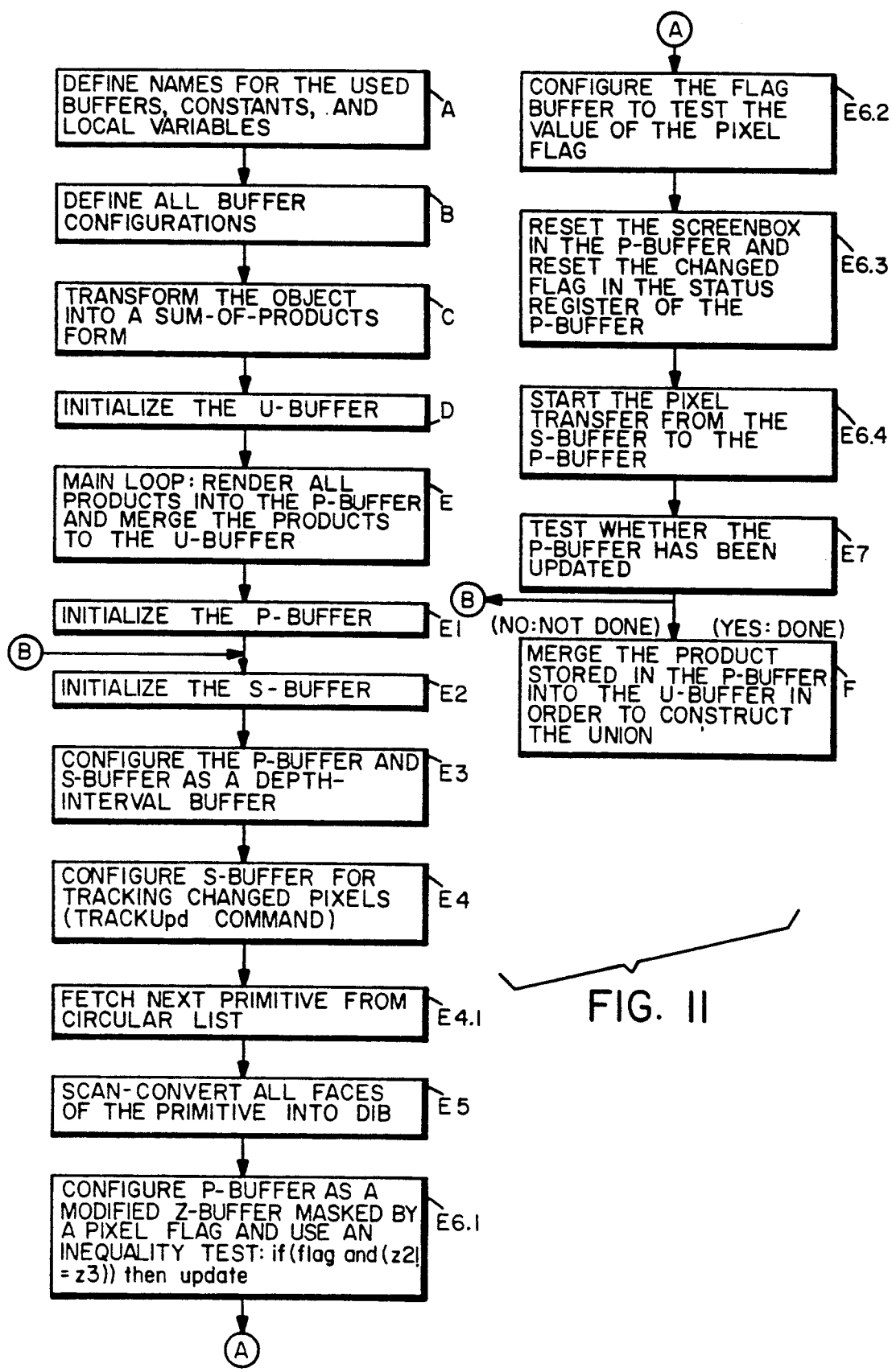
FIG. 11 is a flow chart illustrating the operation of an application that employs the M-buffer.

The first buffer is the P-Buffer that eventually holds the product's image. While the algorithm is in process, it stores, in the P-Buffer, the closest, front-facing points found thus far. The second buffer, a search buffer (S-Buffer), is used to search for front-facing surfaces that lie behind the surface stored in the P-Buffer. If such a surface is found, it replaces the surface stored in the P-Buffer. This causes the P-Buffer to advance, or "trickle", through the scene from front to back. The following pseudo-code details this technique.

initialize the P-Buffer to the background
while not done, circulate through the primitives of the product and do:
  compute into the S-Buffer the next face that lies behind the P-Buffer
  at pixels where the next primitive face is front-facing do:
    copy the S-Buffer into the P-Buffer This description of the Trickle Algorithm is translated into appropriate code for execution by the Host processor 12. The flowchart of FIG. 11 illustrates the overall structure of the application. It is noted that a program segment first defines the used buffers and their configuration. The Flag-Buffer and the P-Buffer are used for different tasks. Hence they are used in different configurations. In order to avoid defining these configurations inside the main loop, they are defined beforehand and stored in variables. The contents of these variables is then efficiently transferred to the buffers.

Step A defines names for the used buffer Modules. Six Surface Buffer Modules 32 are employed: two for a U-Buffer (one for color and one for depth), two for the P-Buffer (one for color and one for depth), and two for the S-Buffer (one for color and one for depth). One Control Buffer 34 is employed to hold pixel Flag bits. Two Virtual Buffers 36 are employed (ScanC, ScanZ) to input color and depth information to the Pixel Bus 38. A ScanFlag is defined as a first Virtual Plane (VPlane). Step A also defines constants and local variables.

Step B defines all buffer configurations. Specifically the U-Buffer is defined as a z-buffer using a tolerance value. The tolerance value is stored within the Operand register 90 of the associated Surface Buffer Module 32. The P-Buffer is employed for two purposes. It is used to form a Depth Interval Buffer (DIB), together with the S-Buffer, and later as a depth-buffer. These configurations are stored as variables, as was previously noted. The S-buffer is used as the back buffer and as the target buffer in the DIB. The Flag bit, stored within the Control Module 34, is changed if the depth test against the P-Buffer, being part of the DIB, passes, and is tested during the operation of the DIB for writing the P-Buffer.

In Step C the object is transformed into a sum-of-products form, and in Step D the U-Buffer is initialized.

In Step E, a main loop renders all of the PRODUCTS into the P-Buffer and then merges the PRODUCTS into the U-Buffer. The main loop includes the steps of initializing the P-Buffer (E1), and waiting for completion of a loop that processes each of the primitives belonging to a PRODUCT as though the primitives were stored in a circular list. This inner loop contains steps for initializing the S-Buffer (E2) and for configuring a depth-interval buffer (DIB) formed by the P-Buffer and the S-Buffer (E3). Pixels passing the DIB test are written into the S-Buffer. Each time a pixel is written into the S-Buffer, a pixel flag is inverted. The S-Buffer is configured to keep track of the pixel being changed by a TRACKUpd command (E4). Next a primitive is fetched from the circular list (E4.1) and all of its faces are scan-converted into the DIB (E5).

After all faces of this primitive are scan-converted the S-Buffer contains surface points that are candidates for lying on a visible front surface of the current product. These points are written into the P-Buffer if the pixel flag is asserted and the z-values stored in the S-Buffer and the P-Buffer are different. Therefore, the P-Buffer is configured to test the incoming z-value for being different from the z-value being stored in its Buffer Memory 46 (E6.1). The Flag Buffer is configured to test the value of the pixel flag (E6.2). The screen box of the P-Buffer is reset and the P-Buffer is configured to construct a bounding box around all pixels being updated in its Buffer Memory 46 (E6.3). Finally, the S-Buffer begins the transfer of pixels from its Buffer Memory 46 to the Buffer Memory 46 of the P-Buffer (E6.4).

The steps of preparing to track the newly generated pixels (E4 and E6.3) include a step of writing the Address Manager 48 for those Surface Buffer Modules 32 that must maintain the bounding box around those pixels. This is accomplished by first sending a RESET command and then sending a TRACK command. Step E6.4 includes transferring, over the Pixel Bus 38, those pixels that have changed in the S-Buffer to the P-Buffer. This involves programming the Address Generator 102 in the Address Manager 48 of the S-Buffer to write pixels to the Pixel Bus 38 by issuing a GENERATE command from the Host processor 12. This causes the counter 118 of the Address Generator 102 to produce pixel addresses for the screen box enclosing the changed pixel.

At Step E7 a test is made to see if the P-Buffer has been updated. If YES, the main loop is completed and execution proceeds to Step F where the product stored in the P-Buffer is merged into the U-Buffer in order to construct the union. If NO, execution continues at Step 2.

EXAMPLE 2

A second example is made in the context of an accumulation buffer of a type described by Paul Haeberli and Kurt Akeley, "The Accumulation Buffer: Hardware Support for High-Quality Rendering", Computer Graphics, 24(4):309-318, August 1990. The accumulator buffer can be used to implement a variety of rendering techniques, such as anti-aliasing, motion blur, or soft shadows. The underlying principle is to render the image several times with slightly different rendering parameters, or viewpoints. The images are accumulated in the accumulation buffer. After all images have been rendered the values stored in the accumulation buffer are divided by the number of rendering passes to obtain final image colors.

The following pseudo-code describes the structure of this algorithm:

```
initialize the accumulation buffer to zero
reset rendering parameters
for all images to be rendered
{ disturb rendering parameters
  clear z-buffer
  render the image and for every pixel (x,y) do:
    if (newZ[x,y] < oldZ[x,y])
    { oldZ[x,y]= newZ[x,y] ;
      accBuffer[x,y] + = newColor[x,y] ;
    }
}
for all pixels (x,y)
    accBuffer[x,y] /= number_of_images_rendered;
```

When this technique is implemented on the M-Buffer 22 architecture, several considerations must be addressed.

First, the accumulation buffer must provide enough bits to hold the intermediate results. Therefore, 16 bits are provided for each of the color components.

Second, since each Surface Buffer 32 stores 32-bits per pixel, the accumulation buffer is distributed across two of the Surface Buffers 32. The first Surface Buffer stores the Red and Blue component, and the second Surface Buffer stores the Green component.

Third, since the Pixel Bus 38 transfers two data items at a time, the three words describing a pixel (z, RB, G) are transferred in two steps. In the first step the z-value is placed onto the bus PData1 38a, and the Red-Blue information is placed on the bus PData2 38b. In the second step, the z-value is asserted to the bus PData1 38a and the Green component is asserted on the bus PData2 38b. This method of sending the pixel data in two steps is a consequence of the preferred embodiment that uses two Pixel Data Buses. If three pixel data buses are employed, all pixel data would be transferred at the same time.

Fourth, in order to distinguish these two phases, a virtual bit plane in the Control Buffer 34 is used. The scan-conversion process sets this bit plane during the first step, and resets it for the second step.

Fifth, the depth comparison is done during both steps. However, the z-value is written to the associated Buffer Memory 46 only during the second step.

Finally, the two Surface Buffers are merged in order to obtain a buffer that holds RGB values. This is accomplished by masking and writing only certain bit planes in the RB Surface Buffer.

Based on the foregoing description it can be appreciated that the M-Buffer 22 described herein is similar in many respects to a Multiple Instruction Single Data (MISD) stream architecture. The M-Buffer 22 is readily scalable to greater levels of complexity and processing power by the provision of additional Buffer Modules. In this regard, a basic graphics buffer may be implemented with but a few of the Buffer Modules, and the graphics buffer may be later enhanced by the addition of more Buffer Modules.

Figure 12:
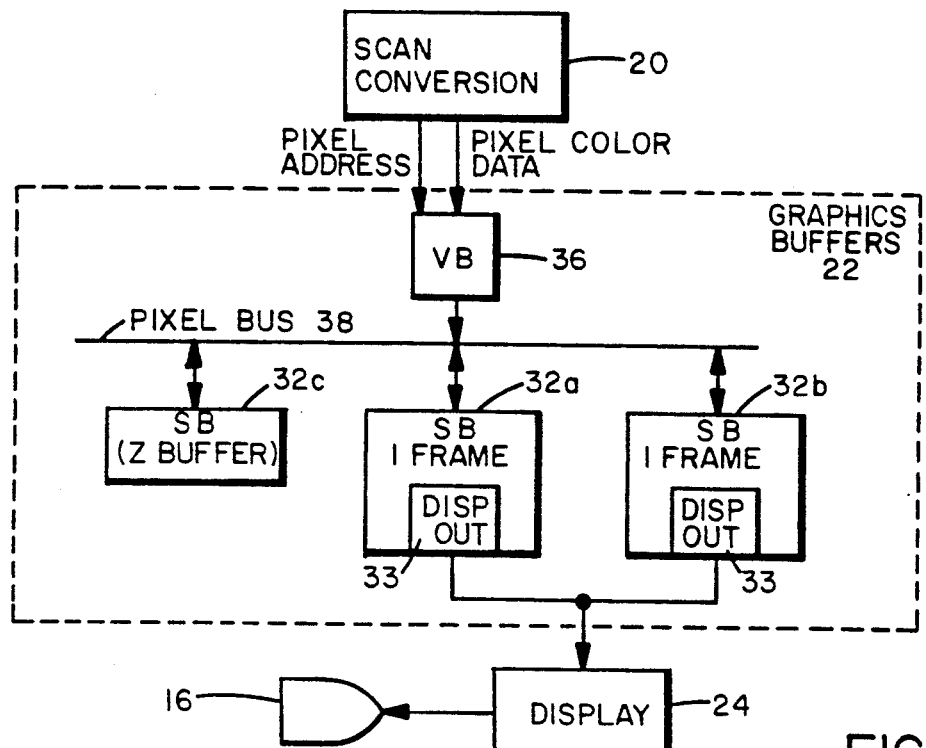
FIG. 12 is a block diagram of a frame buffer constructed in accordance with the invention.

FIG. 12 illustrates a further exemplary graphics buffer implementation. A Virtual Buffer 36 receives an input from the Scan Conversion unit 20 and provides pixel data and pixel addresses to the Pixel Bus 38. Coupled to the Pixel Bus 38 are three Surface Buffer Modules 32a, 32b, and 32c. Surface Buffer Modules 32a and 32b each store, for a noninterlaced system, one complete frame of pixel data. These two Surface Buffer Modules function as a frame buffer and provide double buffering for pixel color data. Surface Buffer Module 32c functions as a depth buffer (z-buffer) and stores, for each screen pixel, a depth value.

Surface Buffer Modules 32a and 32b are each modified to include pixel output circuitry 33 for interfacing directly to the Display 24. In operation, Display 24 reads pixels from one of the Surface Buffer Modules 32a or 32b, while the other is loaded with pixels for a next frame. The Display 24 thus alternates between the two Surface Buffer Modules 32a and 32b. For this embodiment, Surface Buffer Modules 32a and 32b also function as Virtual Buffer Modules for interfacing to the Display 24. A Control Buffer Module 34 is not required for this implementation.

Thus, while the invention has been particularly shown and described with respect to preferred embodiments thereof, it will be understood by those skilled in the art that changes in form and details may be made therein without departing from the scope and spirit of the invention.

Having thus described my invention, what I claim as new, and desire to secure by Letters Patent is:

1. A graphics buffer for use with display means that displays a plurality of pixels, the graphics buffer storing information describing the plurality of pixels, comprising:

a plurality of modules coupled together by a dedicated module-interconnection bus, at least one first one of said modules including a first memory for storing information specifying, for each pixel of the plurality of pixels, a surface characteristic of an image of an object, said memory of said at least one first one of said modules being coupled to said dedicated module-interconnection bus for providing the stored information thereto, at least one second one of said modules including a second memory for storing information for specifying, for each pixel of the plurality of pixels, other information, said at least one first one and said at least one second one of said modules each including processing means coupled to the associated first and second memory for modifying the information within the associated first and second memory;

means for coupling each of said plurality of modules to a host processor means that specifies an operation to be performed, by said processing means, upon the information stored within the associated first and second memory;

at least one third one of said modules being coupled to said dedicated module-interconnection bus and further coupled to a source of pixel information for providing the pixel information to said dedicated module-interconnection bus for reception by at least one of said modules; and at least one fourth one of said modules being coupled to said dedicated module-interconnection bus and further coupled to a consumer of the pixel information for providing pixel information from said dedicated module-interconnection bus for reception by the consumer of pixel information.

2. A graphics buffer as set forth in claim 1 wherein said dedicated module-interconnection bus includes:

a first plurality of signal lines for conveying pixel addresses;

a second plurality of signal lines for conveying pixel data; and a third plurality of signal lines for conveying other information, the other information being descriptive in part of an operation occurring over said dedicated module-interconnection bus.

3. A graphics buffer as set forth in claim 2 wherein said first plurality of signal lines is coupled in common to each of said first one, said second one, said third one, and said fourth one of said modules for being driven by one of said modules with an address of a pixel, the address being referenced to a coordinate system associated with the display means.

4. A graphics buffer as set forth in claim 2 wherein said second plurality of signal lines includes a plurality of data buses.

5. A graphics buffer as set forth in claim 4 wherein at least one of said plurality of data buses is coupled in common to each of said first one, said third one, and said fourth one of said modules.

6. A graphics buffer as set forth in claim 2 wherein said third plurality of signal lines includes:

a Pixel Result Bus comprised of a plurality of signal lines, individual ones of said plurality of signal lines being coupled to one of said plurality of modules for being driven thereby in accordance with a result of a pixel test performed by the module, each of said plurality of signal lines of said Pixel Result Bus being received by others of said plurality of modules and coupled to decision means of said others of said plurality of modules for enabling a determination as to whether the information stored within the associated memory is to be modified, the determination being made in accordance with the pixel test results received from all of said ones of said plurality of modules that are coupled to said Pixel Result Bus.

7. A graphics buffer as set forth in claim 2 wherein said third plurality of signal lines includes a control bus, including:

a signal line for conveying a synchronizing clock signal, the clock signal having a period defining dedicated module-interconnection bus cycles;

a signal line for indicating, when asserted, that there is new pixel information on the dedicated module-interconnection bus;

a signal line for indicating, when asserted, that at least one of the modules requires one or more additional dedicated module-interconnection bus cycles to complete an operation; and a signal line conveying a repetitive signal for sequencing all of said modules through a plurality of operational steps during the processing of pixel information for each pixel.

8. A graphics buffer as set forth in claim 2 wherein said third plurality of signal lines includes a control bus, including:

a signal for indicating, when asserted, that a memory refresh operation is to occur on modules having a memory comprised of dynamic memory devices.

9. A graphics buffer for storing information describing a plurality of pixels, comprising:

a plurality of modules coupled together by a dedicated module-interconnection bus, at least two of said modules each including memory means for storing information specifying, for each pixel of a display means, a characteristic of the pixel, said at least two of said modules each including processing means coupled to the associated memory means for modifying the information stored within the memory means;

wherein said dedicated module-interconnection bus includes:

a first plurality of signal lines for conveying pixel addresses;

a second plurality of signal lines for conveying pixel data; and a third plurality of signal lines for conveying information descriptive of test results performed on pixels.

10. A graphics buffer as set forth in claim 9 wherein:

said at least two of said modules each includes means for generating a plurality of consecutive processing states to accomplish a pixel processing operation, the processing states including:

a Generate Address (GA) state wherein, if enabled, a pixel address is driven to the first plurality of signal lines;

a Modify Address (MA) state wherein a pixel address is read from the first plurality of signal lines, and wherein the pixel address is modified, if required, to accomplish a pixel processing operation;

a Read (RD) state employing the pixel address or the modified pixel address to read data from the associated memory means and, if enabled, to drive the data to the second plurality of signal lines;

a Test & Compute (TC) state wherein at least one of the modules reads the data from the second plurality of signal lines and performs, if enabled, an operation on the data read from the associated memory means, each of the modules also performing a comparison operation on the data read from the associated memory means, a result of the comparison operation being driven to an associated one of the third plurality of signal lines by each of the modules;

a Decide & Modify (DM) state wherein each of the modules reads the third plurality of signal lines and, based on the comparison results driven thereto by other modules during the Test & Compute state, determines whether a result of the operation performed during the Test & Compute state is to be written into the associated memory means; and a Write (WR) state wherein, if enabled by the Decide & Modify state, a value computed during the Test & Compute state is written into the associated memory means at the pixel address or at the modified pixel address.

11. A graphics buffer as set forth in claim 10 wherein said generating means is responsive to a pixel processing operation that performs indirect addressing to generate at least one additional MA state after the RD state and an additional RD state after the at least one additional MA state.

12. A graphics buffer for use with display means that displays n by m pixels, said graphics buffer comprising a plurality of Modules, one of said Modules comprising:
 means for coupling said Module to other Modules over a dedicated Module-interconnection bus;
 memory means having at least (n×m) locations for storing pixel information;
 processor means coupled to said memory means for reading out stored pixel information therefrom, for modifying the pixel information, and for storing the modified pixel information back into said memory means; and
 test means coupled to said memory means for testing pixel information read therefrom and having at least one output for expressing a result of the test, said at least one output being coupled to at least one Result signal line of said dedicated Module-interconnection bus for reception by others of said Modules.

13. A graphics buffer as set forth in claim 12 wherein said Module further includes Address Manager means, coupled to said dedicated Module-interconnection bus, for receiving a pixel address therefrom and for providing the pixel address to said memory means for addressing said memory means to read out stored pixel information from one of said locations.

14. A graphics buffer as set forth in claim 13 wherein said Address Manager means further includes means for modifying the received pixel address before providing the received pixel address to said memory means.

15. A graphics buffer as set forth in claim 14 wherein said modifying means includes means for adding a predetermined offset to the address.

16. A graphics buffer as set forth in claim 13 wherein said Address Manager means includes means, responsive to a command provided to a selected one of said Modules, for generating a pixel address and for providing the generated pixel address to said memory means, said Address Manager means further being coupled to said dedicated Module-interconnection bus for providing the generated pixel address thereto for reception by non-selected ones of said Modules.

17. A graphics buffer as set forth in claim 13 wherein said Module includes sequencing means having an input coupled to a sequencing signal line of said dedicated Module-interconnection bus for being driven thereby through a plurality of sequential pixel processing states.

18. A graphics buffer as set forth in claim 17 wherein said sequencing means includes means for overlapping pixel processing states for simultaneously processing two or more pixels.

19. A graphics buffer as set forth in claim 17 wherein said dedicated Module-interconnection bus includes:
 a first plurality of signal lines for conveying pixel addresses;
 a second plurality of signal lines for conveying pixel data; and
 a third plurality of signal lines for conveying information descriptive of an operation occurring on said dedicated Module-interconnection bus; and wherein said plurality of sequential pixel processing states include:
 a Generate Address (GA) state wherein, if enabled, a pixel address is driven to the first plurality of signal lines from said Address Manager means;
 a Modify Address (MA) state wherein a pixel address is read from the first plurality of signal lines, and wherein the pixel address is modified, if required, to accomplish a pixel processing operation;
 a Read (RD) state wherein the pixel address or the modified pixel address is employed to read data from the memory means and, if enabled, the data read from the memory means id driven to the second plurality of signal lines;
 a Test & Compute (TC) state wherein the Module reads the data from the second plurality of signal lines and wherein the test means compares the data read from the second plurality of signal lines to the data read from the memory means, wherein the processor means computes a revised data value from the data read from the memory means, and wherein the test means outputs the result of the comparison operation to the associated one or more Result signal lines;
 a Decide & Modify (DM) state wherein the Module reads all of the Result signal lines and, based on the results output thereto during the Test & Compute state, determines whether the revised data value computed during the Test & Compute state is to be written into the memory means; and
 a Write (WR) state wherein, if enabled by the Decide & Modify state, the revised data value computed during the Test & Compute state is written into the memory means at the pixel address or at the modified pixel address.

20. A graphics buffer as set forth in claim 19 wherein said sequencing means is responsive to a pixel processing operation that performs indirect addressing so as to generate at least one additional MA state after the RD state and an additional RD state after each additional MA state.

21. A graphics buffer as set forth in claim 19 wherein said third plurality of signal lines include:
 a signal line for conveying a synchronizing clock signal, the clock signal having a period defining dedicated Module-interconnection bus cycles;
 a signal line for indicating, when asserted, that there is new pixel information on the dedicated Module-interconnection bus; and
 a signal line for indicating, when asserted, that at least one of the modules requires one or more additional dedicated Module-interconnection bus cycles to complete an operation.

22. A graphics buffer as set forth in claim 19 wherein said third plurality of signal lines includes:
 a signal for indicating, when asserted, that a memory refresh operation is to occur on Modules having a memory means comprised of dynamic memory devices.

23. A graphics buffer as set forth in claim 13 wherein said Address Manager means includes register means for storing coordinates that define a two-dimensional pixel region of the display means.

24. A graphics buffer as set forth in claim 23 wherein Address Manager means includes means for loading said registers with addresses received from said dedicated Module-interconnection bus.

25. A graphics buffer as set forth in claim 23 wherein said Address Manager means includes means, responsive to information stored within said register means, for generating addresses that lie within the two-dimensional pixel region.

26. A graphics buffer as set forth in claim 25 and further including means for specifying a corner of the two-dimensional pixel region at which to begin the generation of addresses.

27. A graphics buffer as set forth in claim 23 and further including means for storing within said register means coordinates that define a two-dimensional pixel region of the display means corresponding to modified pixels that are stored back into said memory means.

28. A graphics buffer as set forth in claim 12 wherein said Module includes means, having inputs coupled to Result signal lines generated by all Modules and responsive to the test results expressed thereon, for enabling or disabling the storing of said modified pixel information back into said memory means.

29. A graphics buffer as set forth in claim 28 where said enabling or disabling means includes a lookup table means having address inputs coupled to said Result signal lines.

30. A graphics buffer as set forth in claim 29 and further including means for coupling said lookup table means to a Host data processing means such that the Host data processing means is enabled to load said lookup table means with predetermined information for controlling the enabling or disabling of the storing of said modified pixel information.

31. A graphics buffer as set forth in claim 28 wherein said dedicated Module-interconnection bus includes at least one data bus, wherein said processor means includes an operand register means, and wherein said processor means is responsive to an operation code for performing an arithmetic or a logical operation on the output of said memory means and on data stored within said operand register means, and wherein said operation code is provided from an output of said enabling or disabling means.

32. A graphics buffer as set forth in claim 12 wherein said dedicated Module-interconnection bus includes at least one data bus, wherein said processor means includes an operand register means, and wherein said processor means is responsive to an operation code stored within an operation register means for performing an arithmetic or a logical operation on (a) the output of said memory means and on data received from said at least one data bus, or (b) on the output of said memory means and on data stored within said operand register means, or (c) on data stored within said operand register means and on data received from said at least one data bus.

33. A graphics buffer as set forth in claim 32 wherein said operand register means is coupled to a Host data processor means for being loaded thereby with an operand.

34. A graphics buffer as set forth in claim 32 wherein said operand register means is coupled to a Host data processor means for being loaded thereby with an operation code.

35. A graphics buffer as set forth in claim 12 wherein said processor means includes a writemask register means having an output for specifying one or more bits of the output of said memory means that are to be unaffected by the operation of said processing means.

36. A graphics buffer as set forth in claim 12 and including Buffer means coupled to said dedicated Module-interconnection bus for inputting pixel information thereto.

37. A graphics buffer as set forth in claim 12 and including Buffer means coupled to said dedicated Module-interconnection bus for outputting pixel information therefrom.

38. A graphics buffer as set forth in claim 12 wherein said dedicated Module-interconnection bus includes at least one data bus, and wherein said test means includes a reference register means, and wherein said test means is responsive to a test specifier stored within a test register means for comparing (a) the output of said memory means to data appearing on said at least one data bus, or (b) an output of the reference register means to the output of said memory means or to the data appearing on said at least one data bus.

39. A graphics buffer as set forth in claim 38 wherein said test means includes means for adding a content of said reference register means to the output of said memory means prior to the comparison of said output of said memory means to the data appearing on said at least one data bus.

40. A graphics buffer as set forth in claim 38 wherein said test means further includes means for specifying bits that are to be compared one to another.

41. A graphics buffer as set forth in claim 12 wherein a functionality of at least one of said modules is implemented by the operation of data processing means that is external to said graphics buffer.

42. A graphics system comprising:
means for generating a plurality of graphics primitives;
means for transforming the graphics primitives into a plurality of pixels, each pixel being described by a pixel address and pixel data;
display means that displays n by m pixels; and
graphics buffer means for receiving the pixels from the transforming means and for providing pixels to said display means, wherein said graphics buffer means includes a plurality of Modules, one of said Modules comprising:
means for coupling said Module to other Modules over a dedicated Module-interconnection bus;
memory means having at least (n × m) locations for storing pixel data;
processing means coupled to said memory means for reading out stored pixel data therefrom, for modifying the pixel data, and for storing the modified pixel data back into said memory means; and
test means coupled to said memory means for testing pixel data read therefrom and having at least one output for expressing a result of the test, said at least one output being coupled to at least one Result signal line of said dedicated Module-interconnection bus for reception by others of said Modules.

43. A graphics system as set forth in claim 42 wherein said dedicated Module-interconnection bus includes:
a first plurality of signal lines for conveying pixel addresses;
a second plurality of signal lines for conveying pixel data; and
a third plurality of signal lines for conveying information descriptive of the operation of said dedicated Module-interconnection bus.

44. A graphics system as set forth in claim 43 wherein said third plurality of signal lines include:
- a signal line for conveying a synchronizing clock signal, the clock signal having a period defining dedicated Module-interconnection bus cycles;
- a signal line for indicating, when asserted, that there is new pixel data on the second plurality of signal lines; and
- a signal line for indicating, when asserted, that at least one of the modules requires one or more additional dedicated Module-interconnection bus cycles to complete an operation.

* * * * *